US012251667B2

(12) United States Patent
Baldi et al.

(10) Patent No.: US 12,251,667 B2
(45) Date of Patent: Mar. 18, 2025

(54) NANOFUNCTIONALISED POLYMERIC SUPPORT WITH PHOTOCATALYTIC NANOPARTICLES BASED ON TITANIUM DIOXIDE AND ITS USE AS PHOTOCATALYSTS

(71) Applicant: COLOROBBIA CONSULTING S.R.L., Vinci (IT)

(72) Inventors: Giovanni Baldi, Montespertoli (IT); Andrea Cioni, Empoli (IT); Valentina Dami, Larciano (IT); Laura Niccolai, Montelupo Fiorentino (IT); Marco Bitossi, Montelupo Fiorentino (IT)

(73) Assignee: COLOROBBIA CONSULTING S.R.L., Vinci (IT)

( * ) Notice: Subject to any disclaimer, the term of this patent is extended or adjusted under 35 U.S.C. 154(b) by 11 days.

(21) Appl. No.: 17/773,259

(22) PCT Filed: Oct. 29, 2020

(86) PCT No.: PCT/IB2020/060156
§ 371 (c)(1),
(2) Date: Apr. 29, 2022

(87) PCT Pub. No.: WO2021/084468
PCT Pub. Date: May 6, 2021

(65) Prior Publication Data
US 2024/0149224 A1    May 9, 2024

(30) Foreign Application Priority Data

Oct. 31, 2019  (IT) .................. 102019000020122

(51) Int. Cl.
*B01D 69/14* (2006.01)
*B01D 71/02* (2006.01)
(Continued)

(52) U.S. Cl.
CPC ....... *B01D 69/145* (2013.01); *B01D 71/0221* (2022.08); *B01D 71/024* (2013.01);
(Continued)

(58) Field of Classification Search
None
See application file for complete search history.

(56) References Cited

FOREIGN PATENT DOCUMENTS

| CN | 102631949 | 8/2012 |
|---|---|---|
| WO | 2017/060311 | 4/2017 |

OTHER PUBLICATIONS

Altan et al. (J. Mater. Sci. Technol., 2012, 28, 686-692). (Year: 2012).*

(Continued)

*Primary Examiner* — Clare M Perrin
(74) *Attorney, Agent, or Firm* — Silvia Salvadori, P.C.; Silvia Salvadori

(57) ABSTRACT

A support nanofunctionalised with photocatalytic nanoparticles made of polymeric material, preferably transparent or translucid, characterised by a nanoroughness, measured by means of an electron microscope, comprised between 10 and 150 nm and a macroroughness, measured by means of an electron microscope, comprised between 100 and 600 μm, wherein said nano and macro-roughness are diffused internally and/or superficially. A process for preparing the nanofunctionalised support is also described. Further, an use of the nanofunctionalised support as a photocatalyst activated by UV and/or visible light, for the decontamination of a fluid, preferably air and/or water, from organic contaminants, bacteria, moulds, odours and a combination thereof is described. Finally, a filtration device comprising at least one nanofunctionalised support of the invention associated with (Continued)

at least one source of UV and/or visible light configured to irradiate said at least one nanofunctionalised support is described.

22 Claims, 16 Drawing Sheets

(51) Int. Cl.
 B01D 71/06 (2006.01)
 B01J 20/02 (2006.01)
 B01J 20/28 (2006.01)
 C02F 1/28 (2023.01)
 C02F 1/32 (2023.01)
(52) U.S. Cl.
 CPC .......... B01D 71/06 (2013.01); B01J 20/0211 (2013.01); B01J 20/28026 (2013.01); C02F 1/281 (2013.01); B01D 2323/081 (2022.08); B01D 2323/21813 (2022.08); B01D 2323/26 (2013.01); B01D 2325/00 (2013.01); B01J 20/28045 (2013.01); C02F 1/32 (2013.01)

(56) References Cited

OTHER PUBLICATIONS

Son et al. (Nanoscale, 2018, 10, 21696). (Year: 2018).*
Son Supporting information pp. 1-7 (Year: 2018).*
International Search Report issued Feb. 4, 2021 in International (PCT) Application No. PCT/IB2020/060156.
Joon Yeob Lee, et al., "Heterojunction-based two-dimensional N-doped $TiO_2/WO_3$ composite architectures for photocatalytic treatment of hazardous organic vapor", Journal of Hazardous Materials, 2016, vol. 314, p. 22-31.
Soomin Son, et al., "Customizable 3D-printed architecture with ZnO-based hierarchical structures for enhanced photocatalytic performance", Nanoscale, 2018, vol. 10, pp. 21696-21702, with supporting information.

* cited by examiner

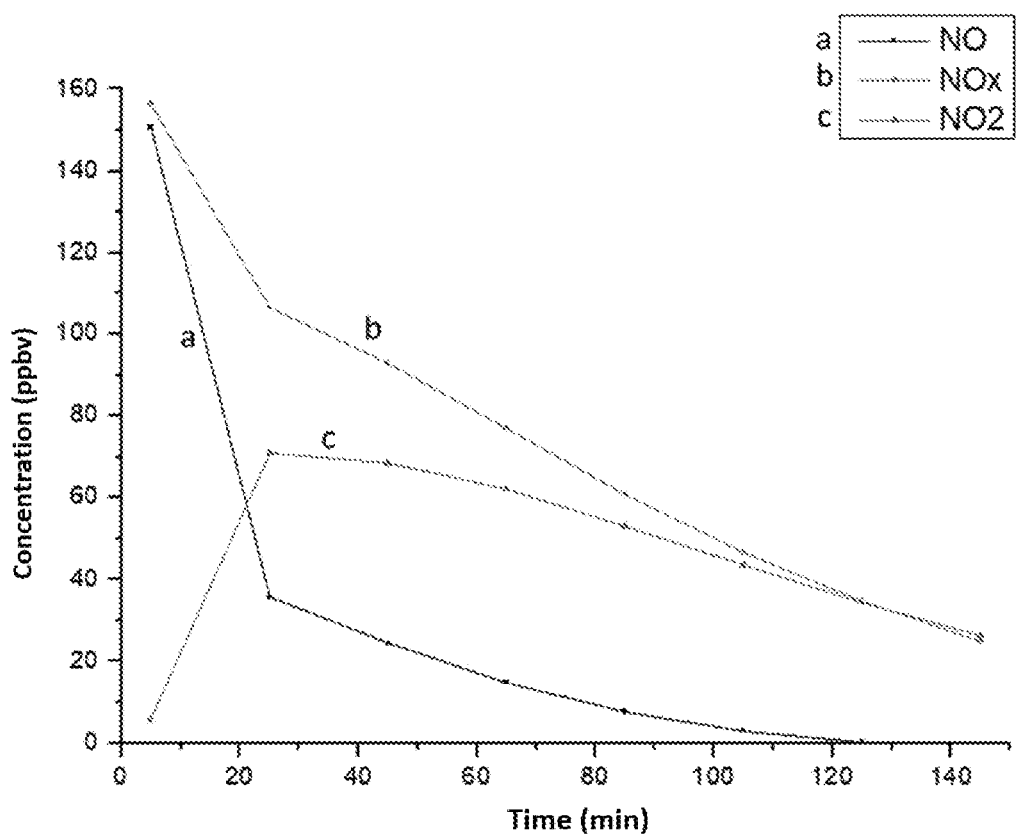

NANOFUNCTIONALISED POLYMERIC SUPPORT WITH PHOTOCATALYTIC NANOPARTICLES BASED ON TITANIUM DIOXIDE AND ITS USE AS PHOTOCATALYSTS

FIELD OF THE INVENTION

The present invention relates to a polymeric support nanofunctionalised with photocatalytic nanoparticles and a process for the production thereof. Said support is suitable for the treatment of a contaminated gaseous or liquid fluid by photocatalytic degradation of polluting agents present therein and is active with UV or visible light and/or sunlight.

PRIOR ART

The use of light energy in processes of photodecomposition of chemical substances, such as, for example, the abatement of pollutants in the liquid or gas phase, is presently one of the research fields of greatest interest from a scientific-technological viewpoint, as well as in terms of the investment of resources by the most industrialised countries. In this field photocatalysts based on titanium dioxide ($TiO_2$) play a fundamental role, since use of the latter shows numerous advantages, including its modest cost, high availability, nontoxicity, chemical and thermal stability and high oxidative capacity, in particular against polluting agents such as nitrogen oxides (NO, $NO_x$, $NO_2$) and volatile organic compounds (VOCs). Even more advantageous, moreover, is the modification of $TiO_2$, which enables the effectiveness of photocatalysts to be increased not only in the ultraviolet spectrum (as in the case of the use of $TiO_2$-based photocatalysts), but also in the solar spectrum, thus making it possible to exploit visible radiation deriving from both sunlight and lamps for interior lighting and thereby overcome the high costs and problems tied to the use of UV lamps, such as, for example, the production of $O_3$. The modification of $TiO_2$ is generally achieved by introducing oxygen defects or doping with transition metals (such as Cu, Ni, Co, Mn, Fe, Cr, Mo, V and W), noble metals (such as Au, Ag and Pt), elements of the rare earth group and, only recently, non-metals (such as, for example, C, N, P, S, F etc.). In particular, doping with nitrogen shows to be one of the most effective approaches for improving the activity of $TiO_2$ in the visible spectrum.

Nanofunctionalised supports made of ceramic material (such as, for example, cordierite, mullite or alumina) or other types of material coated with a photocatalytic coating based on $TiO_2$ or $TiO_2$ nanoparticles doped with various doping agents are known in the present state of the art.

The document by R. Grilli et al., "*Surface characterisation and photocatalytic performance of N-doped $TiO_2$ thin films deposited onto 200 pore size alumina membranes by sol-gel methods*", Materials Chemistry and Physics, vol. 159, 2015, pp. 25-37, describes a sol-gel method developed for depositing nitrogen-doped $TiO_2$ thin films which are photocatalytically active in the visible spectrum and used in water treatment and filtration through porous membranes of $Al_2O_3$ whose pores have a size of 200 nm, whereas document WO2010/151231 discloses a composite material comprising $TiO_2$ doped with nitrogen and activated carbon (AC). As described, for example, in patent application WO2018/207107 of the present Applicant, a nanofunctionalised ceramic support with a honeycomb structure, active in both the UV and visible spectra, comprising a photocatalytic nanoparticle coating of nitrogen-doped $TiO_2$, is produced by means of a method that entails applying to said support an aqueous suspension of nanoparticles of titanium dioxide comprising a nitrogen-containing doping agent and subjecting said support to a heating (calcination) cycle at a temperature comprised between 490 and 510° C. Though widely used today in the sector, given that ceramics, being inert and highly resistant materials, guarantee long lifetimes for the devices in which they are used, this type of support has numerous disadvantages. In fact, the use of ceramic supports poses considerable technological limitations, tied in particular to the hardness and brittleness of the support itself, the lack of flexibility of the finished product, the adoption of a production process with high energy consumption tied to the high-temperature heating (calcination) cycles, the scant possibility of selecting different geometries, thicknesses and shapes, as well as the intrinsic opacity of the ceramic material itself, which precludes the possibility of producing transparent or translucid supports. It is well known, moreover, that most of these disadvantages are also common to many other types of materials, such as, for example, activated carbon or the porous membranes mentioned above. In this context, the technical task at the basis of the present invention is to of propose an optimised alternative to the photocatalytic supports currently present on the market, which has a greater effectiveness and provides a system that is versatile, miniaturisable and customisable both from a fluid-dynamic viewpoint, by virtue of the possibility of varying the geometry, thickness and shape, and from a photocatalytic viewpoint, by virtue of the possibility of controlling the roughness and/or if necessary the transparency of the material, problems that are present, by contrast, in the present state of the art and tied to the use of nanofunctionalised supports made, for example, of ceramics or based on other materials that are fragile, hard and have other undesirable properties. In fact, the search for materials that not only allow for the possibility of obtaining complex geometries and shapes, but preferably also have a certain degree of transparency in order to optimise the penetration of UV or visible light and/or sunlight, and thus, consequently, to optimise photocatalytic performances, represents a challenge that is presently greatly felt in the sector of photocatalytic degradation of polluting agents for applications in water and/or air purification. Among the possible materials that reflect such technological characteristics, plastic materials undoubtedly represent one of the most versatile materials for producing supports in a whole variety of shapes, thicknesses and sizes, with optical properties that may range from complete opacity to total transparency. The techniques for producing this type of supports from plastic material, such as, for example, 3D printing, injection moulding or extrusion, are also less costly from an energy standpoint, as they do not entail high-temperature calcination treatments or further treatments or steps of synthesis as in the case of supports made of ceramic material or other technologically more complex materials (such as, for example, porous $Al_2O_3$ membranes or activated carbon-based composite materials). However, one of the main problems not yet resolved in the present state of the art lies in the adhesion of the nanoparticle coating to the support made of polymeric material and, in particular, in the identification of a photocatalyst that is compatible with said polymeric material and can penetrate into the same and/or form a coating by stably binding to it. Said technical problem is solved by the present invention, which provides a support nanofunctionalised with $TiO_2$-based photocatalytic nanoparticles and relates to the use thereof in photocatalysis for the decontamination of a fluid from organic contaminants, said support being produced with a polymeric material, preferably transparent, characterised by having a nanoroughness and a macroroughness diffused internally and/or superficially which enable an effective adhesion of the photocatalytic nanoparticles to the support and render them effectively available for performing their photocatalytic action when irradiated by a UV and/or visible light source.

SUMMARY OF THE INVENTION

The present invention relates to a support nanofunctionalised with photocatalytic nanoparticles and which is active under irradiation with UV or visible light and/or sunlight. According to a particularly preferred embodiment, the nanofunctionalised support according to the present invention is a nanofunctionalised manufactured product.

The support according to the present invention is a support made of polymeric material, preferably transparent or translucid, characterised by a nanoroughness, measured by means of an electron microscope, comprised between 10 and 150 nm and a macroroughness, measured by means of an electron microscope, comprised between 100 and 600 μm, wherein said nano- and macro-roughness are diffused internally and/or superficially.

Preferably, the photocatalytic nanoparticles are present within said polymeric material and/or in the form of a nanoparticle coating on at least one inner and/or outer surface of the support according to the present invention. The photocatalytic nanoparticles are preferably selected in the group consisting of: $TiO_2$, $TiO_2$ doped with an element selected from among a transition metal, a noble metal, an element of the rare earth group, a non-metal and a combination thereof.

The present invention also relates to a process for preparing the nanofunctionalised support of the invention, the process comprising preparing a support made of polymeric material by 3D printing, injection moulding or extrusion of a polymeric material and the subsequent application of a suspension of photocatalytic nanoparticles.

According to one embodiment of the invention, the polymeric material can already comprise the photocatalytic nanoparticles and can optionally be further functionalised once prepared by 3D printing, injection moulding or extrusion with the application of a suspension of photocatalytic nanoparticles.

The present invention further relates to the use of the nanofunctionalised support as a photocatalyst activated by UV and/or visible light and/or sunlight, for the decontamination of a fluid, preferably air and/or water, from organic contaminants, preferably selected from among NO, $NO_x$, $NO_2$, COV, SOV, bacteria, moulds, odours and a combination thereof. Finally, the present invention relates to a filtration device for decontaminating a fluid, preferably air and/or water, from said organic contaminants, comprising at least one nanofunctionalised support of the present invention associated with at least one light source configured to emit radiation in the UV and/or visible light spectra and to irradiate said at least one nanofunctionalised support.

BRIEF DESCRIPTION OF THE FIGURES

FIG. 19 shows a graph of the trend in the abatement of pollutants (NO, $NO_x$ and $NO_2$) by irradiation, with an LED at 3000 K, of a nanofunctionalised ABS support according to the present invention obtained by 3D printing with a cuboid-shaped structure with a coating of $TiO_2$—N nanoparticles and having a macroroughness of 270 μm ("SAMPLE-R"), as described in Example 7.

DETAILED DESCRIPTION OF THE INVENTION

Figure 1:
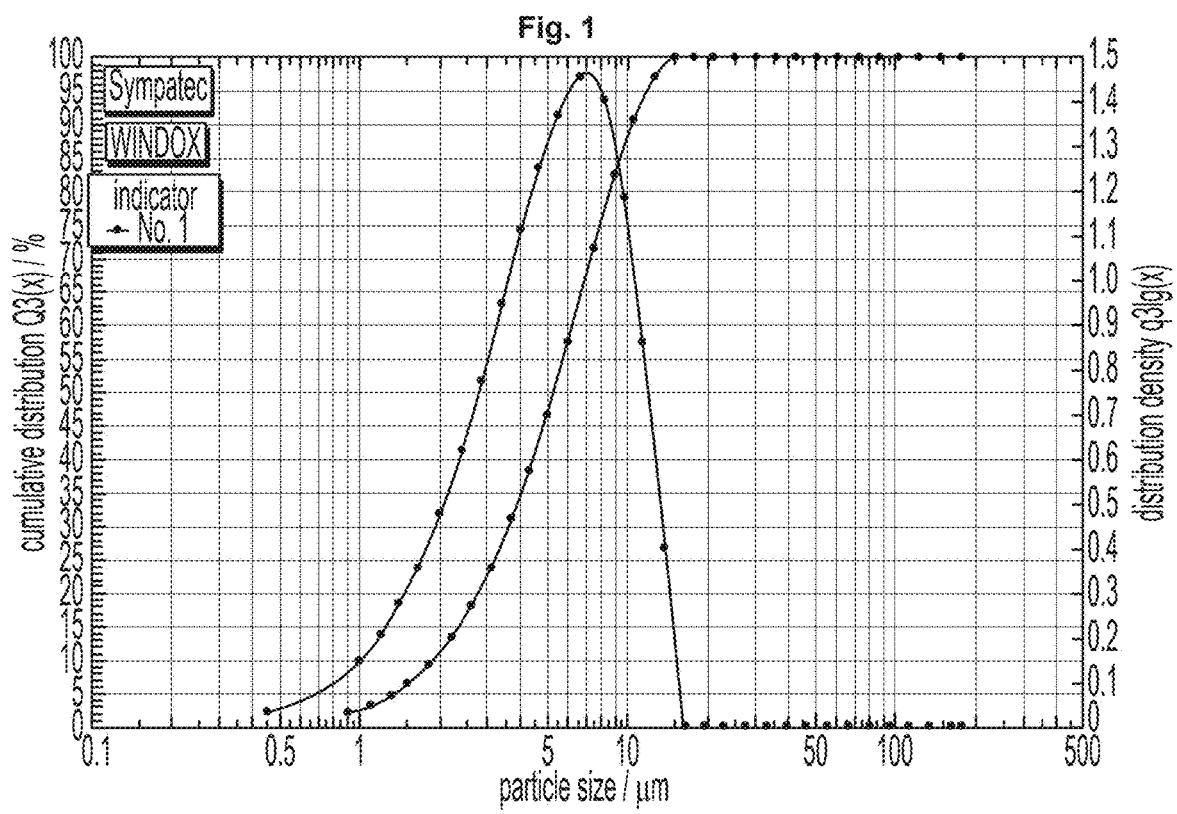
FIG. 1 shows the particle size analysis of the powder sample (prior to calcination) of Example 2, performed dry with Sympatec HELOS (H0969) laser.

The term "polymeric material" or "plastic material" means, for the purposes of the present invention, a wide range of synthetic or semi-synthetic organic polymeric compounds with a high molecular weight, which are malleable and can thus be modelled into solid objects. Said organic polymeric compounds can be pure (co)polymers or (co)polymers comprising other substances, such as, for example, organic and/or inorganic additives, aimed at improving their properties and reducing costs.

For the purposes of the present invention, the term "(co)polymer" is used to indicate both polymers, also called homopolymers, i.e. macromolecules whose polymeric chain contains repetitive units obtained from the union of monomers of only one type, and copolymers, i.e. macromolecules whose polymeric chain contains repetitive units obtained from the union of monomers of two or more different types.

For the purposes of the present invention, the term "transparent" refers to the physical property of transparency, i.e. the property which allows light to pass through a material. In particular, for the purposes of the present invention, a material is defined "transparent" if it transmits light and enables a clear observation of an object through it.

The term "translucid" refers to the physical property of translucency, which allows light to pass through a material in a diffused manner.

In particular, for the purposes of the present invention a material is defined as "translucid" if it transmits light by diffusing it but is not transparent, i.e. if said material does not enable a clear observation of an object observed through it.

The term "opaque" refers to the physical property of opacity, which does not allow light to pass through a material.

In particular, for the purposes of the present invention, a material is defined as "opaque" if it does not transmit light, i.e. if it is impenetrable to light and thus totally prevents the observation of an object through it.

The terms "suspension of nanoparticles" and "nanoparticle suspension", for the purposes of the present invention, are considered synonymous and refer to a mixture in which finely divided solid nanoparticles are dispersed in a solvent, for example water and/or alcohol, so that they are not sedimentable or, after a possible sedimentation, are easily re-dispersible.

The term "nanofunctionalised support" or "nanofunctionalised manufactured product" means that the support or the manufactured product comprises photocatalytic nanoparticles. Said photocatalytic nanoparticles can be present within the material/materials forming the support or the manufactured product or else they can be present within a nanoparticle coating that covers at least one surface, be it an inner and/or outer one, of the support or manufactured product. The expression "inner and/or outer surface of the support or manufactured product" means, for the purposes of the present invention, any surface of the support or manufactured product, whether it is visible from the outside (outer surface) or, in the event of a more complex geometry and/or shape of the support or manufactured product, comprising for example cavities, channels and/or interstices, it is not visible from the outside (inner surface). By way of example, a support or manufactured product produced with the shape and geometry of a hollow sphere will have an outer surface that is visible to the observer and an inner surface facing the internal hollow space and thus not directly visible to the observer.

The term "macroroughness" means the property possessed by a surface of a body consisting of geometric micro imperfections, possibly deriving from intrinsic characteristics of the material forming the body and/or resulting from machining; such micro imperfections, measured by means of a roughness tester or by observation with an electron microscope, generally appear in the form of depressions, valleys or scratches, of variable shape, depth and direction, whose alternation and arrangement on the surface creates protuberances or peaks. Said protuberances or peaks can have a variable shape and/or geometry. Said protuberances or peaks have an average size in the order of tens or hundreds of micrometres and thus define the surface as a "macrorough" surface. In the case of the polymeric support of the present invention, the macroroughness is comprised between 100 and 600 µm, preferably between 200 and 300 µm, i.e., in other words, said protuberances or peaks have an average size comprised between 100 and 600 µm, preferably between 200 and 300 µm (as shown by the numerical references (1) and (2) in FIGS. 6 and 6a). "Average size of the protuberances or peaks" thus means, for the purposes of the present invention, the average distance between one protuberance (or peak) and the next, which may be likened to the distance between one depression (or valley or scratch) and the next as shown by the references (1) and (2) in FIG. 6, 6a or 7.

The term "nanoroughness" means the property, measured by means of an electron microscope or AFM, tied to the presence of nanoparticles within a material and/or as a coating on the surface thereof, and which renders the surface thereof "rough" on a nanometric scale, i.e. a surface that exhibits imperfections in the form of protuberances or peaks having an average size in the order of nanometres. In the case of the polymeric support of the present invention, the nanoroughness is comprised between 10 and 150 nm, preferably between 10 and 50 nm, more preferably between 20 and 40 nm, i.e., in other words, said protuberances or peaks have an average size comprised between 10 and 150 nm, preferably between 10 and 50 nm, more preferably between 20 and 40 nm, said protuberances or peaks being created by the nanoparticles which emerge partially or totally from the surface or are present thereon as a coating as shown for example by the reference (3) in FIG. 7. The term "UV light" means ultraviolet radiation, i.e. the range of electromagnetic radiation with a wavelength immediately below that of light visible to the human eye and immediately above that of X-rays, i.e. with a wavelength comprised between about 10 and about 380 nm.

The term "visible light" means visible radiation, i.e. the range of electromagnetic radiation with a wavelength immediately above that of ultraviolet radiation and immediately below that of infrared radiation, i.e. with wavelength comprised between about 380 and about 720 nm.

The term "sunlight" means solar radiation, i.e. the radiant energy emitted in interplanetary space by the sun, which comprises electromagnetic radiation at various wavelengths. In particular, about 50% of solar radiation is emitted in the infrared region (NIR, near the visible region and comprised between about 750 nm and about 1500 nm), about 5% in the ultraviolet region and the rest in the visible region.

For the purposes of the present invention, the term "fluid" refers to a material (i.e. a substance or a mixture of several substances) which deforms unlimitedly (flows) if subjected to a shear strain, irrespective of the entity of the latter. The term "fluid" is therefore used to indicate the state of matter that comprises liquids, aeriform substances (gases), plasma and plastic solids.

The present invention relates to a support nanofunctionalised with photocatalytic nanoparticles, which is active under irradiation with UV and/or visible light and/or sunlight. According to a particularly preferred embodiment, said support is a manufactured product, said manufactured product preferably being selected in the group consisting of: a furnishing object, a design object, and a component part. The support according to the present invention is a support made of polymeric material characterised by a nanoroughness, measured by means of an electron microscope, comprised between 10 and 150 nm and a macroroughness, measured by means of an electron microscope, comprised between 100 and 600 µm, wherein said nano- and macroroughness is diffused internally and/or superficially. Said nanoroughness is preferably comprised between 10 and 50 nm, preferably between 20 and 40 nm. Preferably, said macroroughness is comprised between 200 and 300 µm. The expression "nano/macroroughness diffused internally and/or superficially" means that the support according to the present invention can exhibit said nanoroughness and macroroughness in every part thereof, i.e. either on at least one inner and/or outer surface of the support or incorporated within the polymeric material that forms the support (observable and measurable, in the latter case, by sectioning the support). In other words, the support according to the present invention is a support made of polymeric material characterised by a nanoroughness, measured by means of an electron microscope, that is diffused internally and/or superficially and comprised between 10 and 150 nm, preferably between 10 and 50 nm, more preferably between 20 and 40 nm, said nanoroughness deriving from the presence of the aforesaid photocatalytic nanoparticles comprised within said polymeric material and/or as a coating on the surface of said support. In other words, said nanoroughness derives from the presence of protuberances or peaks having an average size comprised between 10 and 150 nm, preferably between 10 and 50 nm, more preferably between 20 and 40 nm, created by the nanoparticles which emerge partly or totally from the surface of the support or which are present thereon as a coating (as shown, for example, by the reference (3) in FIG. 7), said surface preferably being an inner and/or outer surface and/or a section of the support. In addition to the aforesaid nanoroughness, the support according to the present invention is a support made of polymeric material that is simultaneously also characterised by a macroroughness, measured by means of an electron microscope, that is diffused internally and/or superficially and comprised between 100 and 600 µm, preferably between 200 and 300 µm, said macroroughness deriving from the presence of geometric micro imperfections. Said micro imperfections manifest themselves as protuberances or peaks having a variable shape and/or geometry. Said protuberances or peaks have an average size comprised between 100 and 600 µm, preferably between 200 and 300 µm, said protuberances or peaks being created by the alternation of depressions, valleys or scratches, wherein the distance between one depression (or valley or scratch) and the next is comprised between 100 and 600 µm, preferably between 200 and 300 µm. "Average size of the protuberances or peaks" thus means the average distance between one protuberance (or peak) and the next, which can be likened to the distance between one depression (or valley or scratch) and the next as shown by the numerical references (1) and (2) in FIG. 6, 6a, or 7. According to a particularly preferred embodiment of the present invention, said protuberances or peaks are regularly and/or homogeneously distributed in every part of the support, i.e. either on at least one inner and/or outer surface of the support or incorporated within the polymeric material which forms the support (observable and measurable, in the latter case, by sectioning the support), said protuberances or peaks preferably being distributed in every part of the support in the form of a regular pattern.

Without wishing to be bound to a specific theory, it is possible to hypothesise that said macroroughness is connected to the polymeric material and/or the processing thereof to obtain the support. In particular, it is possible to hypothesise that said geometric micro imperfections are due to intrinsic properties of the polymeric material and/or the processing thereof to obtain the support. Preferably, as described below in relation to the process for obtaining the support according to the present invention, said processing is selected in the group consisting of: the 3D printing, injection moulding and extrusion techniques, optionally followed by further operations suitable for creating the specific macroroughness desired as previously described. As regards the nanoroughness, on the other hand, it is possible to hypothesise that said nanoroughness derives from the functionalisation of the support with the photocatalytic nanoparticles which, once in contact with the polymeric material characterised by said macroroughness, become organised so as to create a characteristic nanoroughness.

Without wishing to be bound to a specific theory, the Applicant has surprisingly found that, thanks to the combination of said nanoroughness comprised between 10 and 150 nm, preferably between 10 and 50 nm, more preferably between 20 and 40 nm, and said macroroughness, measured by means of an electron microscope, comprised between 100 and 600 µm, preferably between 200 and 300 µm, it is possible to obtain a nanofunctionalised support made of polymeric material in which there is perfect compatibility between the photocatalytic nanoparticles with which the support is nanofunctionalised and the polymeric material itself. Said compatibility, as demonstrated in the Examples section, is closely connected to the amount of photocatalytic nanoparticles that can effectively functionalise the support and, consequently, the photocatalytic performances thereof. Said compatibility makes it possible, in fact, to have a better anchorage of the photocatalytic nanoparticles to the support and to be able not only to effectively functionalise the support with high amounts of photocatalytic nanoparticles, but also to maintain the latter effectively adherent thereto, thus ensuring a long-lasting photocatalytic activity with high performances. Furthermore, thanks to the specific nano- and macroroughness values of the support of the present invention, it is possible to assure an effective dose of the photocatalytic nanoparticles present both within it and in the form of a nanoparticle coating on the at least one inner and/or outer surface of the support.

According to one embodiment of the present invention, the nanofunctionalised support is a support made of polymeric material wherein said polymeric material comprises at least one (co)polymer selected from among: polymethylmethacrylate (PMMA), polyamide (PA), polycarbonate (PC), polylactic acid (PLA), polyethylene terephthalate (PET), polyethylene (PE), polyvinyl chloride (PVC), polystyrene (PS), acrylonitrile styrene acrylate (ASA), acrylonitrile butadiene styrene (ABS), polyethylene terephthalate glycol (PET-g), polyurethane (PU), polypropylene (PP), copolyester, and a combination thereof. According to a preferred embodiment, the nanofunctionalised support is a support selected from among: acrylonitrile butadiene styrene (ABS) and polyethylene terephthalate glycol (PET-g), preferably acrylonitrile butadiene styrene (ABS). Preferably, the nanofunctionalised support according to the present invention is opaque, translucid, or transparent. According to a preferred embodiment of the invention, the nanofunctionalised support is translucid or transparent so as to be able to advantageously exploit up to 100% of the incident luminous radiation that is respectively diffused by or passes through the support and thereby obtain superior photocatalytic performances. According to an even more preferred embodiment, the nanofunctionalised support is transparent. The support according to the present invention is preferably a nanofunctionalised support with photocatalytic nanoparticles that are activated by UV and/or visible light and/or sunlight, selected in the group consisting of: $TiO_2$, $TiO_2$ doped with an element selected from among a transition metal, a noble metal, an element of the rare earth group, a non-metal and a combination thereof. More preferably, said transition metal is selected from among Cu, Ni, Co, Mn, Fe, Cr, Mo, V, W, Y and Sc, said noble metal is selected from among Au, Ag and Pt, said element of the rare earth group is selected from among Ce, La, Pr, Nd, Te Yb, and said non-metal is selected from among C, N, P, S and F. The size of said photocatalytic nanoparticles is preferably comprised between 10 and 150 nm, preferably between 10 and 50 nm, preferably between 20 and nm, more preferably between 48 and 150 nm, measured as a Z-average with the DLS technique (Dynamic Light Scattering, Malvern Instruments). The range 48-150 nm, for example, means that the nanoparticles have a Z-average equal to a whole or decimal number comprised between 48 and 150 nm, with a polydispersity index of less than 0.3, preferably comprised between 0.21 and 0.29, more preferably comprised between 0.216 and 0.286. Such polydispersity values indicate an excellent uniformity in the size of the nanoparticles. Therefore, if, for example, the Z-average of the nanoparticles is equal to 49.9 with a polydispersity index of 0.221, it means that the nanoparticles are uniformly distributed from a dimensional viewpoint and nearly all of them have an average diameter of about 49.9 nm.

The photocatalytic activity of the support nanofunctionalised with the photocatalytic nanoparticles according to the present invention is an oxidative photocatalytic activity, since under irradiation (by UV or visible light and/or sunlight according to the type of nanoparticles) the nanoparticles become a powerful oxidant of many organic substances present, for example, in the air or water, such as $NO_x$, VOCs (volatile organic compounds), VOS (volatile organic solvents), bacteria, moulds or odours, the latter consisting mainly of organic substances and bacteria, thus contributing to the abatement thereof and consequently to the purification of air and/or water.

According to a particularly preferred embodiment of the invention, said support is a support functionalised with photocatalytic nanoparticles that are active both with UV and visible light (and consequently also sunlight), more preferably nitrogen-doped $TiO_2$ nanoparticles ($TiO_2$—N). Preferably, said $TiO_2$—N nanoparticles are present in the polymeric material of the support and/or in the form of a nanoparticle coating on at least one inner and/or outer surface of the support.

The amount of doping nitrogen present in said $TiO_2$—N nanoparticles is comprised between 1 and 5% by weight, preferably between 1.5 and 3% by weight relative to the total weight of the nanoparticles.

According to an even more preferred embodiment, said $TiO_2$—N nanoparticles have, under X-ray diffraction analysis, at least one brookite crystalline phase in an amount of 10 to 99% by weight relative to the weight of the nanoparticles. Said $TiO_2$—N nanoparticles preferably further have a rutile crystalline phase. Even more preferably said $TiO_2$—N nanoparticles having at least one brookite crystalline phase and a rutile crystalline phase also have an anatase crystalline phase. In one embodiment, said $TiO_2$—N nanoparticles have a brookite crystalline phase in an amount of 90 to 99% by weight relative to the weight of the nanoparticles, the remaining amount to 100% being a rutile and/or anatase crystalline phase. In one embodiment, said $TiO_2$—N nanoparticles have at least two crystalline phases of $TiO_2$: a brookite crystalline phase in an amount of 10 to 99% by weight relative to the weight of the nanoparticles and a rutile crystalline phase (or else an anatase crystalline phase) in an amount of 25 to 90% by weight relative to the weight of the nanoparticles. In one embodiment, said $TiO_2$—N nanoparticles have at least two crystalline phases of $TiO_2$: a brookite crystalline phase in an amount of 10 to 75% by weight relative to the weight of the nanoparticles and a rutile crystalline phase (or else an anatase crystalline phase) in an amount of 25 to 90% by weight relative to the weight of the nanoparticles. In one embodiment, said $TiO_2$—N nanoparticles have a rutile crystalline phase (or else an anatase crystalline phase) and a brookite crystalline phase, each preferably present in an amount equal to about 50% by weight relative to the weight of the nanoparticles. In a particularly preferred embodiment, said $TiO_2$—N nanoparticles have three crystalline phases of $TiO_2$: a brookite crystalline phase in an amount of 20 to 75%, an anatase crystalline phase in an amount of 35 to 80%, and a rutile crystalline phase in an amount of 35 to 40% by weight relative to the weight of the nanoparticles. The presence of significant amounts of the brookite crystalline phase within the photocatalytic $TiO_2$—N nanoparticles according to this particularly preferred embodiment of the invention brings considerable advantages as regards the photocatalytic properties of the support nanofunctionalised with said nanoparticles. Without wishing to be bound to any theory, the better photocatalytic activity of the brookite phase as compared to the other two crystalline phases can be linked to the fact that, since the photocatalytic activity depends on the number of $TiO_2$ molecules per cell unit, the brookite phase, having a larger cell volume, also has a greater amount of surface oxygen available for photocatalysis.

Advantageously, according to this particularly preferred embodiment of the invention, wherein the support is nanofunctionalised with $TiO_2$—N nanoparticles, the photocatalytic activity of the support takes place under irradiation with both UV light and visible light (and therefore also under solar irradiation).

Moreover, according to one embodiment, the support nanofunctionalised with the photocatalytic nanoparticles according to the present invention can comprise a further functionalisation with one or more catalysing and/or biocidal agents selected from among: a source of silver (in the form of a silver salt, e.g. a silver nitrate or sulphate, or silver nanoparticles), manganese oxide (IV) ($MnO_2$) nanoparticles, zinc oxide (ZnO) nanoparticles, a source of copper (in the form of a copper salt, e.g. a copper nitrate or sulphate, or copper nanoparticles); and a combination thereof.

According to this embodiment, the nanofunctionalised support according to the present invention thus also has, in addition to a photocatalytic activity, a catalytic and/or biocidal activity even when not irradiated by a source of light (UV and/or visible light and/or sunlight).

According to one embodiment, the support nanofunctionalised with the photocatalytic nanoparticles of the invention is a support made of polymeric material characterised by a nanoroughness and a macroroughness as previously defined and wherein said photocatalytic nanoparticles are present within said polymeric material and/or in the form of a nanoparticle coating on at least one inner and/or outer surface of said support. The support nanofunctionalised with the photocatalytic nanoparticles according to the present invention is preferably characterised by comprising said nanoparticles in an amount comprised between 1 and 10 $g/m^2$, preferably between 2 and 8 $g/m^2$, even more preferably between 4 and 7 $g/m^2$. With regard to the embodiments which envisage that said photocatalytic nanoparticles are present within said polymeric material or that they are present both within and in the form of a nanoparticle coating, in this case one can speak of nanoroughness that is both internally and superficially diffused. With regard to the embodiment which envisages that said photocatalytic nanoparticles are present solely in the form of a nanoparticle coating on at least one inner and/or outer surface of said support, in this case one can speak only of superficially diffused nanoroughness. In one embodiment, the nanofunctionalised support of the invention can be entirely or partly coated with the photocatalytic nanoparticles. "Entirely coated" means that the support has all inner and/or outer surfaces coated with the photocatalytic nanoparticles. In other words, the inner and/or outer surfaces of the support have, overall, a percentage of coverage greater than 95%, preferably greater than 98%. "Partly coated" means that the inner and/or outer surfaces of the support have, overall, a percentage of coverage less than 95%, preferably less than 98%. In this case, for example, only some of the surfaces of the support may be coated with the photocatalytic nanoparticles. The nanoparticle coating preferably has a thickness, measured by means of an electron microscope, comprised between 1 and 5 µm, preferably between 1.5 and 3 µm, more preferably between 1.8 and 2.6 µm.

Advantageously, thanks to the nanoroughness and macroroughness values previously described, the support according to the present invention can be effectively coated with a nanoparticle coating of the aforesaid thickness, which proves to be compatible and adherent to the underlying polymeric material over an extended period of time.

According to one embodiment of the invention, the nanofunctionalised support as previously described comprises a plurality of channels and/or cells suitable for the passage of a fluid. Said channels and/or cells preferably have a cross section with a variable geometry, preferably selected from among circular, hexagonal, square, triangular, rectangular and a combination thereof. More preferably, said channels and/or cells identify a path for the fluid having a variable geometry. Said path is preferably selected from among linear, tortuous, spiral or a combination thereof.

According to one embodiment, the nanofunctionalised support of the invention has a structure selected in the group consisting of: a layered structure, an interwoven mesh structure, a woven fabric structure and a honeycomb structure with a variable number and/or shape of cells, said shape being, for example, selected from among circular, hexagonal, square, triangular, rectangular and a combination thereof.

According to one embodiment, the nanofunctionalised support according to the present invention can comprise several layers in variable numbers and sizes, each layer preferably having a structure as previously described.

The nanofunctionalised support according to this embodiment preferably comprises at least two layers joined to each other by means of an interlock mechanism or with a plug system.

The selection of the number of layers and the assembly thereof and of their structure will vary according to the fluid-dynamic characteristics it is desired to obtain.

Figure 8:
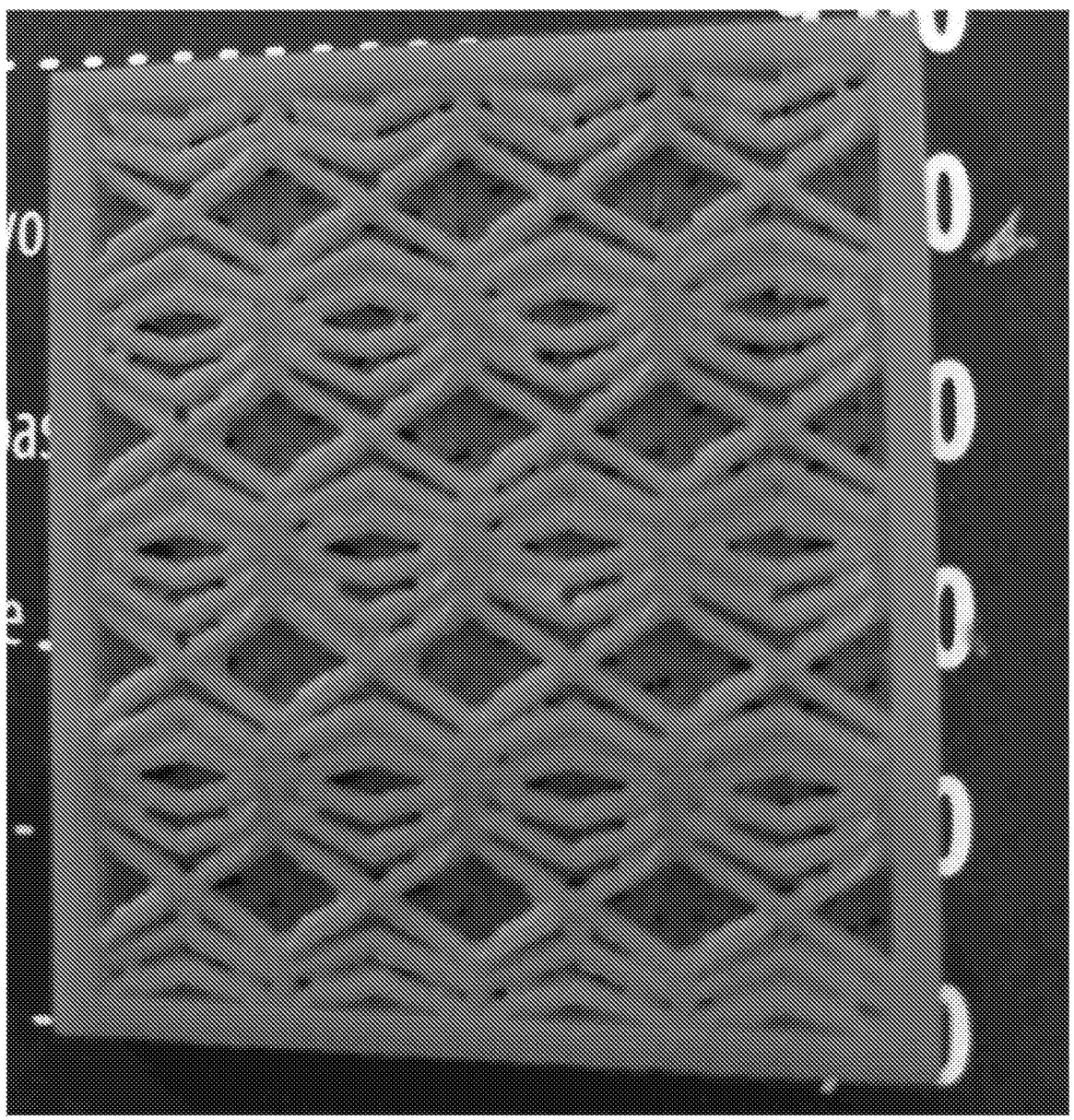
FIG. 8 shows a photo of a nanofunctionalised translucid support made of ABS having a layered form with complex interweaving comprising a plurality of channels and/or cells produced by 3D printing according to one embodiment of the present invention.

FIG. 8 shows a translucid nanofunctionalised manufactured product produced from ABS by means of 3D printing with a layered, interwoven mesh structure, according to one embodiment of the present invention.

According to a preferred embodiment, the nanofunctionalised support of the invention has a honeycomb structure. In other words, said support with a honeycomb structure comprises a matrix of thin walls of polymeric material which define a plurality of parallel conduits, which are open at both ends so as to allow the passage of a fluid, preferably air and/or water. Advantageously, said plurality of conduits defines a plurality of oxidation sites in which, through the activation, by an incident photon, of the photocatalytic properties of the nanoparticles present within the polymeric material itself and/or in the form of a coating of said walls, the pollutants present in the fluid to be treated, on passing through said plurality of conduits, will be adsorbed and degraded so that a purification of the fluid is obtained. Said honeycomb structure is preferably characterised by a CPSI (cells per square inch) value comprised between 40 and 120, preferably between 50 and 100, more preferably between 50 and 70, even more preferably between 55 and 65.

According to one embodiment, the nanofunctionalised support of the invention has a structure selected in the group consisting of: a spheroidal structure, preferably a sphere, or a cylindrical structure, a parallelepiped structure, a cuboidal structure, a polyhedral structure, or a structure in the form of "beads".

For the purposes of the present invention, "beads" means pearl-shaped particles having at least one through hole.

Preferably, according to this embodiment, said structure is a structure having a characteristic size larger than 0.1 mm, preferably larger than 1 mm, preferably comprised between 1 and 100 mm, more preferably comprised between 1 and 50 mm. Characteristic size means, for the purposes of the present invention, the average diameter (in the case of a spheroidal structure or a sphere), the average height and/or the average diameter (in the case of a cylindrical structure or beads), the average size of the sides and/or bases and/or of the oblique sides (in the case of a parallelepiped, cuboidal or polyhedral structure).

According to a preferred embodiment, the nanofunctionalised support of the invention has a spheroidal structure, preferably a spherical structure. Preferably, according to this embodiment, said spheroidal structure, preferably a spherical structure, has an average diameter larger than 1 mm, preferably comprised between 1 and 100 mm, more preferably comprised between 1 and 50 mm. According to one embodiment, the nanofunctionalised support of the invention has a spheroidal structure, preferably a hollow spherical structure.

According to one embodiment, the nanofunctionalised support of the invention has a spheroidal structure, preferably a spherical structure, with at least one through hole, said at least one through hole having an average diameter that is smaller than the average diameter of the nanofunctionalised support having a spheroidal structure, preferably a spherical structure.

According to a particularly preferred embodiment, the nanofunctionalised support of the invention has a cylindrical structure. Preferably, according to this embodiment, said cylindrical structure has an average diameter comprised between 0.1 and 10 mm, preferably comprised between 0.5 and 5 mm, and an average height comprised between 1 and 50 mm, preferably between 2 and 20 mm. Said nanofunctionalised support having a cylindrical structure is preferably a masterbatch.

According to one embodiment, the nanofunctionalised support of the invention has a hollow cylindrical structure.

According to one embodiment, the nanofunctionalised support of the invention has a cylindrical structure with at least one through hole, said at least one through hole being preferably perpendicular or parallel to the axis of the cylindrical structure (height). Said at least one through hole preferably having an average diameter that is smaller than the average diameter of the nanofunctionalised support having a cylindrical structure according to the present invention.

The nanofunctionalised support of the invention preferably comprises or consists of a plurality of the aforesaid nanofunctionalised supports. According to one embodiment, the aforesaid nanofunctionalised supports are not constrained to one another. According to an alternative embodiment, the aforesaid nanofunctionalised supports are constrained to one another, preferably incorporated in a matrix, preferably a polymer matrix, and/or are welded and/or adhere to one another.

The nanofunctionalised support of the invention preferably comprises or consists of a plurality of the aforesaid nanofunctionalised supports having a cylindrical structure or in the form of beads, as previously described. According to this embodiment, when the nanofunctionalised support is used within a filtration device to decontaminate a fluid from organic contaminants (as described further below), said plurality of nanofunctionalised supports having a cylindrical structure are preferably included within said device inside a special container.

The present invention further relates to a process for preparing a nanofunctionalised support as previously defined. The process according to the present invention comprises the steps of:

(a) preparing a support made of polymeric material, having at least one inner and/or outer surface, by means of a technique selected in the group consisting of: 3D printing, injection moulding or extrusion of a polymeric material, said polymeric material possibly being a polymeric material comprising photocatalytic nanoparticles within it;

(b) applying, on the at least one inner and/or outer surface of the support obtained in step (a), a suspension of photocatalytic nanoparticles, wherein said nanoparticles are present in the suspension at a concentration comprised between 1 and 30% weight/weight, by means of a technique selected in the group consisting of: "spray coating", "flow coating", "dip coating", "spin coating", "Meyer bar coating", "gravure coating", "knife coating", "kiss coating", "die coating" and "film transfer";

with the condition that, if the photocatalytic nanoparticles are present within the polymeric material of step (a), step (b) can optionally be omitted.

In the embodiments wherein said photocatalytic nanoparticles are present within the polymeric material forming the support, or wherein said photocatalytic nanoparticles are present both within the polymeric material and in the form of a nanoparticle coating, the polymeric material comprising photocatalytic nanoparticles used in step (a) is preferably a polymeric nanocomposite material. Said polymeric nanocomposite material is preferably obtained by compounding, i.e. by adding a powder comprising the photocatalytic nanoparticles to the polymeric material, preferably in the form of pellets, and subsequently extruding either the nanofunctionalised support made of polymeric material according to the present invention or, alternatively, of a polymeric nanocomposite thread, which is subsequently processed by means of a 3D printing or injection moulding technique in order to produce the nanofunctionalised support made of polymeric material according to the present invention.

In the embodiment wherein the support is further nanofunctionalised with one or more catalysing and/or biocidal agents, it is possible to add, during said compounding, one or more catalysing and/or biocidal agents selected from among: a source of silver (in the form of a silver salt, e.g. a silver nitrate or sulphate, or silver nanoparticles), manganese oxide (IV) ($MnO_2$) nanoparticles, zinc oxide (ZnO) nanoparticles, a source of copper (in the form of a copper salt, e.g. a copper nitrate or sulphate, or copper nanoparticles); and a combination thereof. Advantageously, the possibility of being able to functionalise the polymeric material before processing it to produce the nanofunctionalised support according to the present invention enables production to be standardised, thereby obtaining different nanofunctionalised supports comprising the same amount of photocatalytic nanoparticles.

Advantageously, this embodiment further enables a second functionalisation to be carried out, optionally, by coating the support (already nanofunctionalised in step (a), wherein the photocatalytic nanoparticles are present within the polymeric material) with a photocatalytic nanoparticle coating through the application of a suspension of photocatalytic nanoparticles, said photocatalytic nanoparticles being the same as or different from the ones already present within the polymeric material. Preferably, the support prepared according to step (a) can undergo a further treatment adapted to impart further macroroughness. Said further treatment is preferably selected in the group consisting of: laser treatment, embossing of the mould, and a combination thereof. The mould itself can be designed and constructed so that the desired roughness is formed precisely during the mechanical action of pressing and the subsequent extraction from the mould. This proves particularly advantageous in the event that the support is prepared with the injection moulding or extrusion techniques, which impart to the support macroroughness values that are generally lower than those required by the present invention.

According to a particularly preferred embodiment, in step (a) the support of the invention is prepared by means of 3D printing.

Advantageously, the operation of forming the support by means of 3D printing effectively produces a macroroughness which—though in the case of traditional applications it represents a problem, being undesirable—in the case of the present invention constitutes an advantage, as it enables the compatibility between the polymeric material of the support and the photocatalytic nanoparticles to be effectively increased.

In a preferred embodiment of the invention, the suspension of photocatalytic nanoparticles of step (b) is a suspension in an organic solvent or in a mixture of water and an organic solvent. Said organic solvent is preferably selected in the group consisting of: acetone, ethyl alcohol, isopropyl alcohol, methyl alcohol, and a combination thereof, more preferably ethyl alcohol.

Said nanoparticles are preferably present in the suspension at a concentration comprised between 5 and 15% weight/weight.

In order to ensure better applications on the substrate, the rheology of said suspension is preferably characterised by a density comprised between 0.6 and 1 $g/cm^3$, more preferably between 0.7 and 0.9 $g/cm^3$ and a viscosity comprised between 0.8 and 1.3 mPa·s, more preferably between 0.9 and 1.1 mPa·s, measured at 25° C.

As demonstrated in the Examples section, the Applicant has surprisingly found that, with the same weight of the applied solution of photocatalytic nanoparticles, the amount of nanoparticles effectively adhering to the support and, therefore, functionalising the support, shows to be considerably higher (preferably comprised between 1 and 5 $g/m^2$, preferably between 1.5 and 3 $g/m^2$, more preferably between 1.8 and 2.6 $g/m^2$) in the case of the nanofunctionalised support according to the present invention, characterised by a nanoroughness, measured by means of an electron microscope, comprised between and 150 nm and a macroroughness, measured by means of an electron microscope, comprised between 100 and 600 μm, wherein said nano and macro-roughness is diffused internally and/or superficially, as compared to a support made of the same polymeric material, but having different nanoroughness and macroroughness values.

In the embodiment wherein the support is further nanofunctionalised with one or more catalysing and/or biocidal agents, it is possible to add to the suspension of photocatalytic nanoparticles of step (b) one or more catalysing and/or biocidal agents selected from among: a source of silver (in the form of a silver salt, e.g. a silver nitrate or sulphate, or silver nanoparticles), manganese oxide (IV) ($MnO_2$) nanoparticles, zinc oxide (ZnO) nanoparticles, a source of copper (in the form of a copper salt, e.g. a copper nitrate or sulphate, or copper nanoparticles); and a combination thereof.

In the particularly preferred embodiment of the invention wherein the support is a support nanofunctionalised with photocatalytic $TiO_2$—N nanoparticles as previously described, said $TiO_2$—N nanoparticles are preferably obtained by means of a process developed by the Applicant, which comprises the steps of:

(i) preparing a suspension of $TiO_2$ nanoparticles in water;
(ii) adding a nitrogen doping agent to the suspension and mixing until homogeneous;
(iii) drying the suspension to which the nitrogen doping agent was added until obtaining a powder with a moisture residue comprised between 0 and 15% by weight;
(iv) subjecting the dried powder to calcination at a temperature comprised between 400 and 600° C., thereby obtaining a calcined powder;
optionally
(v) subjecting the calcined powder to grinding in a solvent, thereby obtaining a suspension of $TiO_2$—N nanoparticles in a solvent;
and optionally
(vi) diluting the suspension of step (v) with further solvent.

In the embodiment wherein the process according to the present invention comprises step (a) of preparing a support made of polymeric material, and wherein said polymeric material comprises photocatalytic nanoparticles and is obtained by compounding, i.e. by adding a powder comprising photocatalytic nanoparticles to the polymeric material, said powder comprising photocatalytic nanoparticles, in the embodiment wherein said photocatalytic nanoparticles are $TiO_2$—N nanoparticles, is a calcined powder obtained by carrying out steps (i)-(iv) of the process described above.

In the embodiment wherein the process according to the present invention comprises step (b) of applying a suspension of photocatalytic nanoparticles on the at least one inner and/or outer surface of the support, in the embodiment wherein said photocatalytic nanoparticles are $TiO_2$—N nanoparticles, said suspension is obtained by carrying out steps (i)-(v) or (i)-(vi) of the process described above.

The suspension of $TiO_2$ nanoparticles in water of step (i) is a stable suspension prepared according to the process described in WO200788151 of the same Applicant, entirely incorporated herein by reference.

In particular, the suspension of $TiO_2$ nanoparticles in water of step (i) is a suspension of $TiO_2$ nanoparticles in anatase crystalline form.

The $TiO_2$ nanoparticles in suspension have a size comprised between 30 and 50 nm, measured with methods known in the art, such as FEG-SEM (scanning electron microscopy), TEM (transmission electron microscopy) and DLS (Dynamic Light Scattering). The polydispersity index of the nanoparticles is less than 0.3, preferably comprised between 0.21 and 0.29, more preferably between 0.216 and 0.286.

The concentration of $TiO_2$ nanoparticles suspended in water is comprised between 1 and 10% by weight, preferably between 2 and 8% by weight.

The suspension of nanoparticles is stable for very long periods without manifesting phenomena of coagulation or conglomeration. Therefore, said suspension can be prepared with the process of WO200788151 and then stored, also for a long time, before being used as a starting product for the process according to the present invention.

The process for obtaining the suspension of $TiO_2$ nanoparticles in water, preferably in anatase crystalline form, comprises a first step in which a titanium alkoxide in water is subjected to acid hydrolysis at a temperature comprised between 15 and 95° C. and for a time comprised between 12 hours and 72 hours, in the presence of a non-ionic surfactant, preferably Triton X-100.

The titanium alkoxide is selected from among titanium methoxide, titanium ethoxide, titanium normal-propoxide, titanium isopropoxide, titanium normal-butoxide and titanium isobutoxide. The preferred alcoxide is titanium propoxide.

The mineral acid used for the acid hydrolysis of the titanium alkoxide is selected from among: hydrochloric acid, nitric acid, sulphuric acid, perchloric acid, hydrobromic acid and hydrogen iodide.

In step (ii), a nitrogen doping agent selected from an inorganic ammonium salt and an organic nitrogen compound is added to the suspension of $TiO_2$ nanoparticles in water, preferably in anatase crystalline form. The nitrogen doping agent is preferably selected from among an amine, an organic ammonium salt and an inorganic ammonium salt. The nitrogen doping agent is preferably selected from among diethanolamine, ammonium citrate, tetrabutylammonium hydroxide and triethanolamine. Ammonium citrate has provided better results in terms of process and ease of drying of the suspension than the other nitrogen doping agents and is thus the preferred nitrogen doping agent.

The nitrogen doping agent is added to the aqueous suspension of $TiO_2$ nanoparticles in an amount comprised between 2 and 6% by weight, preferably between 3 and 5% by weight.

The addition of the nitrogen doping agent to the aqueous suspension of $TiO_2$ nanoparticles takes place under stirring and the formation of a white gel is observed.

The suspension is then kept under stirring for a time comprised between 4 and 24 hours, that is, until a homogeneous white suspension is obtained.

The suspension obtained comprises from 4 to 8% by weight of $TiO_2$ and from 6 to 30% by weight of nitrogen relative to the weight of $TiO_2$. The suspension preferably comprises from 5 to 7% by weight of $TiO_2$ and from 8 to 25% by weight of nitrogen relative to the weight of $TiO_2$.

The suspension obtained comprises $TiO_2$ nanoparticles having a size comprised between 48 and 150 nm, measured as the Z-average with DLS (Dynamic light scattering, Malvern Instruments). The range of 48-150 nm means that the nanoparticles have a Z-average equal to a whole or decimal number comprised between 48 and 150 nm, with a polydispersity index of less than 0.3, preferably comprised between 0.21 and 0.29, more preferably between 0.216 and 0.286. Such polydispersity values indicate an excellent uniformity in the size of the nanoparticles of the suspension. Therefore, if for example the Z-average of the nanoparticles is equal to 49.9 with a polydispersity index of 0.221, this means that the suspension comprises very uniform nanoparticles, almost all of which have an average diameter of about 49.9 nm.

The suspension of $TiO_2$ nanoparticles thus obtained is subjected to drying in step (iii) by means of the spray-drying technique, or electric or gas ovens, or by heating with microwaves. The latter treatment is to be preferred, since the process shows to be more efficient and faster compared to the use of the conventional spray-drying technique; furthermore, the treatment with microwaves makes it possible to obtain a powder with a lesser degree of aggregation/agglomeration, which makes the subsequent optional grinding step (step (v)) more efficient.

The drying temperature is comprised between 100 and 150° C., preferably between 110 and 140° C. Drying can last from 10 to 24 hours, preferably from 15 to 20 hours.

At the end of drying, one obtains a very fine powder with a moisture residue comprised between 0 and 15% by weight and good flowability.

The particle size of the powder is less than 20 µm, preferably less than 15 µm, calculated with laser diffraction using a Sympatec HELOS (Model H0969). Preferably, 99% of the powder particles have a size of less than 15 µm and 90% of the powder particles have a size of less than 11 µm. More preferably, 50% of the powder particles have a size of less than 5.5 µm and 10% of the powder particles have a size of less than 2 µm.

The calcination of step (iv) preferably takes place at a temperature comprised between 450 and 500° C.

Heating is carried out by treating the dried powder in a muffle furnace or by means of microwaves. The latter treatment is to be preferred, since the process shows to be more efficient and faster compared to conventional heating in a muffle furnace; furthermore, the treatment with microwaves makes it possible to obtain a powder with a lesser degree of aggregation/agglomeration, which makes the subsequent optional grinding step (step (v)) more efficient.

The calcination is carried out for a time comprised between 1 and 2 hours, preferably with a ramp of 1 or 2 hours to arrive at the calcination temperature. The heating gradient can be comprised between 7 and 14° C. per minute.

Without wishing to be bound to a specific theory, the Applicant has found that during the calcination step, the nitrogen doping of $TiO_2$ takes place; the nitrogen penetrates into the $TiO_2$ nanoparticles, positioning itself in a substitution position within the crystal lattice of the $TiO_2$ and/or in an interstitial position, that is, within the crystal planes of the $TiO_2$.

The calcined powder is obtained as an aggregate powder of nitrogen-doped $TiO_2$ ($TiO_2$—N) which, under X-ray diffraction analysis, has at least one brookite crystalline phase in an amount of 10 to 99% by weight relative to the weight of the calcined powder.

In one embodiment, said calcined powder further comprises a rutile crystalline phase.

In one embodiment, the calcined powder comprising at least one brookite crystalline phase and a rutile crystalline phase, further comprises an anatase crystalline phase as well.

In one embodiment, the calcined powder comprises from 90 to 99% by weight, relative to the weight of the calcined powder, of a brookite crystalline phase of $TiO_2$, the remaining amount to 100% being a rutile and/or anatase crystalline phase.

In one embodiment, the calcined powder of $TiO_2$—N comprises at least two crystalline phases of $TiO_2$: a brookite crystalline phase in an amount of 10 to 99% by weight relative to the weight of the calcined powder and a rutile crystalline phase (or else an anatase crystalline phase) in an amount of 25 to 90% by weight relative to the weight of the calcined powder.

In one embodiment, the calcined powder of $TiO_2$—N comprises at least two crystalline phases of $TiO_2$: a brookite crystalline phase in an amount of 10 to 75% by weight relative to the weight of the calcined powder and a rutile crystalline phase (or an anatase crystalline phase) in an amount of 25 to 90% by weight relative to the weight of the calcined powder.

In one embodiment, the calcined powder comprises a rutile crystalline phase (or else an anatase crystalline phase) and a brookite crystalline phase, each preferably present in an amount equal to about 50% by weight relative to the weight of the calcined powder.

In one embodiment, the calcined powder comprises three crystalline phases of $TiO_2$: a brookite crystalline phase in an amount of 20 to 75%, an anatase crystalline phase in an amount of 35 to 80% by weight relative to the weight of the calcined powder and a rutile crystalline phase in an amount of 35 to 40% by weight relative to the weight of the calcined powder.

The calcined powder has a degree of purity greater than 95% by weight, preferably equal to or greater than 99% by weight, since the diffraction analysis did not reveal the presence of phases other than the crystalline phases of $TiO_2$ described above.

Without being bound to any theory, the Applicant deems that the formation of a calcined powder of doped $TiO_2$ comprising at least one brookite crystalline phase is ascribable mainly to the use of the $TiO_2$ suspension obtained with the process of WO200788151, but probably also to a combination between the use of this starting product, and the drying and calcination steps as just described.

The presence of the brookite phase is a surprising and unexpected result considering that the starting product consists essentially of $TiO_2$ in the anatase phase. The brookite phase brings some considerable advantages as regards the photocatalytic properties of the final suspension obtained at the end of the process.

The above-described process thus makes it possible to obtain a $TiO_2$—N in nanoparticle form which has photocatalytic properties that are analogous or even superior to those of the $TiO_2$—N-based photocatalysts known in the art, thanks to the formation of the brookite crystalline phase in a significant amount.

The calcined powder can be subjected to grinding in a solvent, preferably in an organic solvent or water, in order to break it down and re-suspend it in the solvent (steps (v) and (vi) of the process described above).

In step (v) the calcined powder is subjected to grinding in a high-energy ball mill with the aid of a solvent, for example water, acetone, ethyl alcohol or mixtures thereof.

The grinding takes place at a speed comprised between 1000 and 2000 rpm for a time comprised between 30 and 120 minutes, preferably between 80 and 100 minutes.

At the end of the grinding one obtains a very concentrated suspension in the solvent, with concentration values of the $TiO_2$—N nanoparticles comprised, for example, between 15 and 30% by weight. In particular, the suspension obtained after grinding is a suspension of $TiO_2$—N nanoparticles in an organic solvent, for example ethyl alcohol or acetone or mixtures thereof, or else in water, or in mixtures of water and an organic solvent.

The size of the nanoparticles is comprised between 48 and 150 nm, measured as a Z-average with DLS (Dynamic light scattering, Malvern Instruments). The range of 48-150 nm means that the nanoparticles have a Z-average equal to a whole or decimal number comprised between 48 and 150 nm, with a polydispersity index less of than 0.3, preferably comprised between 0.21 and 0.29, more preferably between 0.216 and 0.286. Such polydispersity values indicate an excellent uniformity in the size of the nanoparticles of the suspension. Therefore, if per example the Z-average value of the nanoparticles is equal to 49.9 with polydispersity index of 0.221, this means that the suspension comprises very uniform nanoparticles, almost all of which have an average diameter of about 49.9 nm.

The suspension obtained at the end of step (v) can be too concentrated and have a rheology that is not suitable for some industrial applications, above all for the application of coatings on a substrate.

For this reason, a subsequent step (vi) is also envisaged, wherein the suspension is further diluted in the same solvent, preferably in an organic solvent or water or mixtures thereof, such as, for example, ethyl alcohol, acetone, water or mixtures thereof. The final concentration of the $TiO_2$—N powder in the solvent is thus brought to values comprised between 0.1 and 20% by weight, preferably between 1 and 10% by weight.

The suspension of $TiO_2$—N nanoparticles obtained at the end of the process (step (v) or step (vi)) comprises nanoparticles with the same crystalline phases shown in the calcined powder (step (iv)).

Surprisingly, the Applicant has further found that the $TiO_2$—N suspension obtained at the end of step (v) or (vi) of the process described above is stable for over 6 months, notwithstanding the presence of a significant amount of the brookite crystalline phase, which, as is known from the literature, is the least stable crystalline phase of $TiO_2$.

The Applicant has further found that the support obtained with the process according to the present invention (steps (a) and (b)), once nanofunctionalised with the photocatalytic $TiO_2$—N nanoparticles, whether they are present within the polymeric material of the support and/or in the form of a nanoparticle coating, has said $TiO_2$—N nanoparticles with the same crystalline phases shown in the calcined powder of step (iv) and in the suspension of $TiO_2$—N nanoparticles obtained at the end of step (v) or, optionally, step (vi) of the process described above.

In all of the above-mentioned embodiments, the process according to the present invention preferably comprises, before step (b) a further step (b'). Said step (b') is a step of pre-activating the support obtained in step (a) by immersion in an organic solvent, for an immersion time comprised between 0.1 and 50 minutes and a subsequent heat treatment at a temperature comprised between 30 and 60° C.

Said organic solvent is preferably selected in the group consisting of: acetone, ethyl alcohol, isopropyl alcohol, methyl alcohol and a combination thereof.

More preferably, said organic solvent is acetone.

Said immersion time is preferably comprised between 1 and 10 minutes.

Said heat treatment is preferably carried out at a temperature comprised between 35 and 55° C.

Advantageously, said pre-treatment step (b') proves to be effective in further increasing the compatibility between the polymeric material of the support and the subsequent nanoparticle coating, thus further increasing the adhesion of said coating to the support and, consequently, improving the photocatalytic performance thereof over time.

According to one embodiment, the process according to the present invention comprises, after step (b), a further step (c). Said step (c) is a step of subjecting the support obtained to a heat treatment at a temperature comprised between 30 and 90° C., for a treatment time comprised between 0.5 and 3 hours.

Said temperature is preferably comprised between 35 and 55° C.

Said treatment time is preferably comprised between 0.5 and 2 hours.

Advantageously, the heat treatment step (c) makes it possible to assure a further improved adhesion of the photocatalytic nanoparticle coating.

Advantageously, the choice of the material of the support according to the present invention makes it possible not only to obtain, by 3D printing techniques, injection moulding or extrusion, a support with variable geometries, thicknesses and shapes which can be modulated according to need, but also to adjust the optical properties thereof. In particular, according to a particularly preferred embodiment, the nanofunctionalised support of the present invention is translucid or transparent, even more preferably transparent.

The Applicant has found that modulating the parameters listed above (shape, thickness, geometry, degree of opacity/translucency/transparency of the support, degree of roughness imparted to the support by the presence of nanoparticles within it and/or in the form of a nanoparticle coating) enables the properties and photocatalytic performance of the support to be varied and optimises—as it is possible to modulate the time of contact between the fluid and the nanofunctionalised support—the amount of photocatalytic nanoparticles present in and/or on the support and the percentage of luminous radiation that irradiates, optionally passing through the support itself or being diffused thereby.

Furthermore, the Applicant has found that modulating the nano- and macro-roughness values makes it possible to assure an effective adhesion of the photocatalytic nanoparticle coating, which otherwise is generally scarcely compatible with a support made of polymeric material and has a tendency to peel and come detached, thus deteriorating the photocatalytic performance of the support over time.

A further object of the present invention relates to the use of the nanofunctionalised support as previously described as a photocatalyst activated by UV and/or visible light (and/or, consequently, sunlight), for the decontamination of a fluid, preferably air and/or water, from organic contaminants.

Said organic contaminants are preferably selected from among NO, $NO_x$, $NO_2$ COVs, SOV, bacteria, moulds, odours, and a combination thereof. According to a preferred embodiment of the invention, wherein the support nanofunctionalised with photocatalytic nanoparticles is a support made of transparent or translucid polymeric material, the activation of the photocatalytic nanoparticles with UV and/or visible light proves to be particularly effective since, thanks to the optical properties of transparency or translucency, it is possible to exploit up to 100% of the luminous radiation and thus effectively exploit the photocatalytic power of the nanoparticles present within the polymeric material and/or as nanoparticle coating on at least one inner and/or outer surface of the support.

In the embodiment wherein the support is further nanofunctionalised with one or more a catalytic and/or biocidal agents, as previously described, the nanofunctionalised support according to the present invention therefore also has, in addition to a photocatalytic activity, a catalytic and/or biocidal activity, and is thus suitable for being used for the decontamination of a fluid, preferably air and/or water, even when not irradiated by a source of light (UV and/or visible light and/or sunlight).

In a further aspect, the present invention also relates to a filtration device for decontaminating a fluid, preferably air and/or water, from organic contaminants, comprising at least one nanofunctionalised support, as previously described, associated with at least one light source, said light source being configured to emit radiation in the UV and/or visible light spectrum and to irradiate said at least one nanofunctionalised support.

In one embodiment, said filtration device further comprises at least one system for ventilation and/or the distribution of a fluid, preferably air and/or water, configured to allow the passage of said fluid within the filtration device itself, preferably favouring contact with and/or the passage through the at least one nanofunctionalised support.

In one embodiment, said filtration device comprising at least one nanofunctionalised support of the invention and at least one light source is characterised in that said at least one nanofunctionalised support completely surrounds and/or incorporates said at least one light source, said at least one light source preferably being positioned so as not to obstruct the flow of the fluid, preferably air and/or water, during its passage within the device.

According to the preferred embodiment wherein the nanofunctionalised support of the invention comprises or consists of a plurality of nanofunctionalised supports having a cylindrical structure or the form of "beads", which are not constrained to one another, said plurality of supports is preferably arranged in such a way as to completely surround and/or incorporate said at least one light source, said at least one light source preferably being positioned so as not to obstruct the flow of the fluid, preferably air and/or water, during its passage within the device.

Said at least one light source is preferably selected from a light source, preferably an LED, with a colour temperature comprised between 6000 and 7000 K. Said at least one light source preferably also has an irradiance comprised between 70 and 100 W/m$^2$. Said at least one light source preferably also has a yield in terms of luminous flux comprised between 500 and 1000 lm.

In the embodiment wherein the support is further nanofunctionalised with one or more a catalytic and/or biocidal agents, as previously described, the filtration device comprising at least one nanofunctionalised support according to the present invention therefore also has, in addition to a photocatalytic activity, a catalytic and/or biocidal activity and is thus suitable for being used for the decontamination of a fluid, preferably air and/or water, even in the absence of irradiation by a source of light (UV and/or visible light and/or sunlight), for example when at least one light source comprised in the device itself is not in action. The present invention advantageously makes it possible to customise the nanofunctionalised support and therefore also the filtration device comprising it according to the use and the pollutant to be treated.

Furthermore, given the versatility of the process and the materials used to produce the nanofunctionalised support, the present invention advantageously enables said support and, consequently, the filtration device that will comprise it, to be miniaturised.

Another advantage of the present invention is that it allows an optimisation of the fluid-dynamic system, in particular as regards the choice of thicknesses and the possibility of varying the geometries of the support, for example by creating an internal design of the support providing for multiple paths that advantageously make it possible to increase the contact time of the polluting agents present in the water and/or in the air to be treated.

EXAMPLES

Example 1

806.0 g of dibasic ammonium citrate is added to 19194.00 g of a 6% aqueous suspension of titanium dioxide (PH000025), obtained through the synthesis described in document WO2007088151, in a 20 L reactor, under stirring and at room temperature. After 24 hours of mixing, one observes the formation of a white suspension containing 0.498% nitrogen and 5.76% $TiO_2$ (which corresponds to 8.6% by weight of nitrogen relative to $TiO_2$). The size of the nanoparticles in the suspension obtained was measured by DLS (Dynamic Light Scattering, Malvern Instruments), and a $Z_{average}$ value (which corresponds to the hydrodynamic diameter $D_z$, hence the particle size) equal to 49.9 nm was obtained, with a polydispersity index (PdI) of 0.221.

Example 2 the suspension obtained as per example 1 is then dried by means of the spray drying technique (Buchi Mini Spray Dryer B-290) with an inlet temperature of 130° C. A dry powder is thus obtained, whose particle size was evaluated by means of a dry laser diffraction measurement (Sympatec dry laser, HELOS model (H0969)). The analysis is illustrated in FIG. 1. The powder obtained is very fine with x99=14.21 μm (value indicating that 99% of the powder particles have a size of less than 14.21 μm) and with good flowability.

Figure 2:
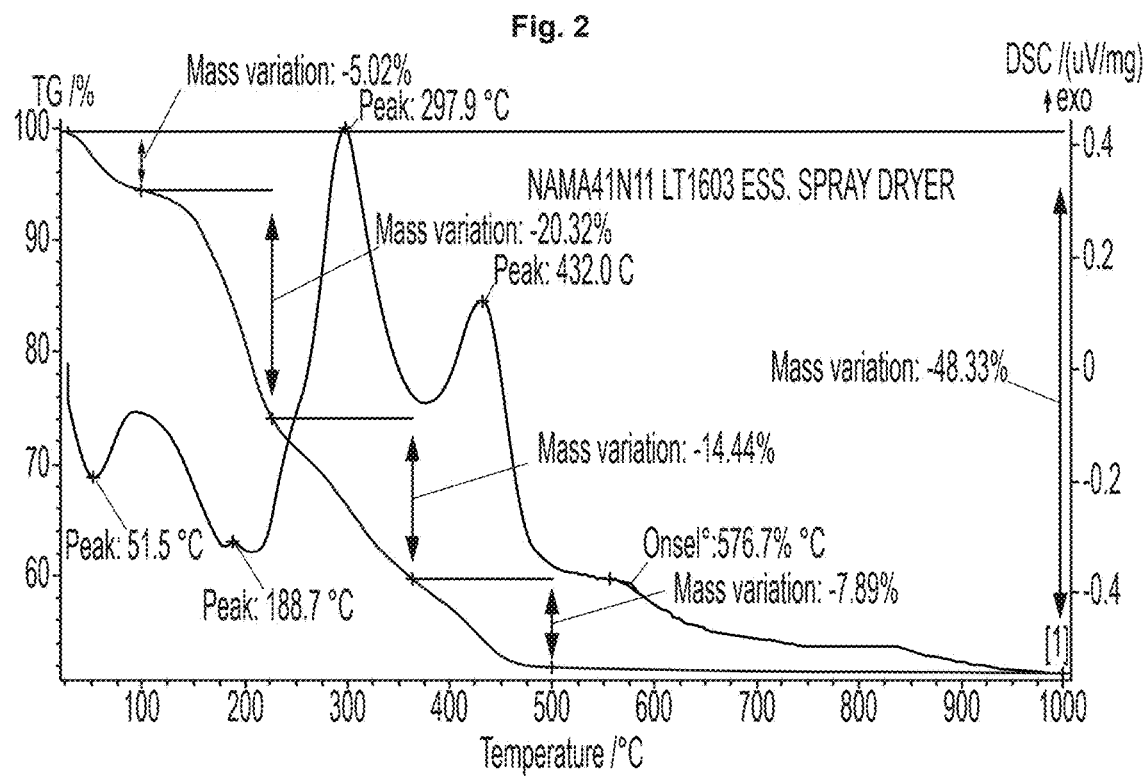
FIG. 2 shows a DSC graph of the pre-calcination powder sample of Example 2 obtained with the spray-drying technique.

A thermogravimetric DSC analysis (in FIG. 2) was also performed; it showed a loss of mass at low temperatures (−5.02% at 100° C.) due to the loss of residual water in the powder. This analysis also enabled identification of the correct calcination temperature for the dried powder for the next step: this temperature is comprised between 450 and 500° C.

Figure 3:
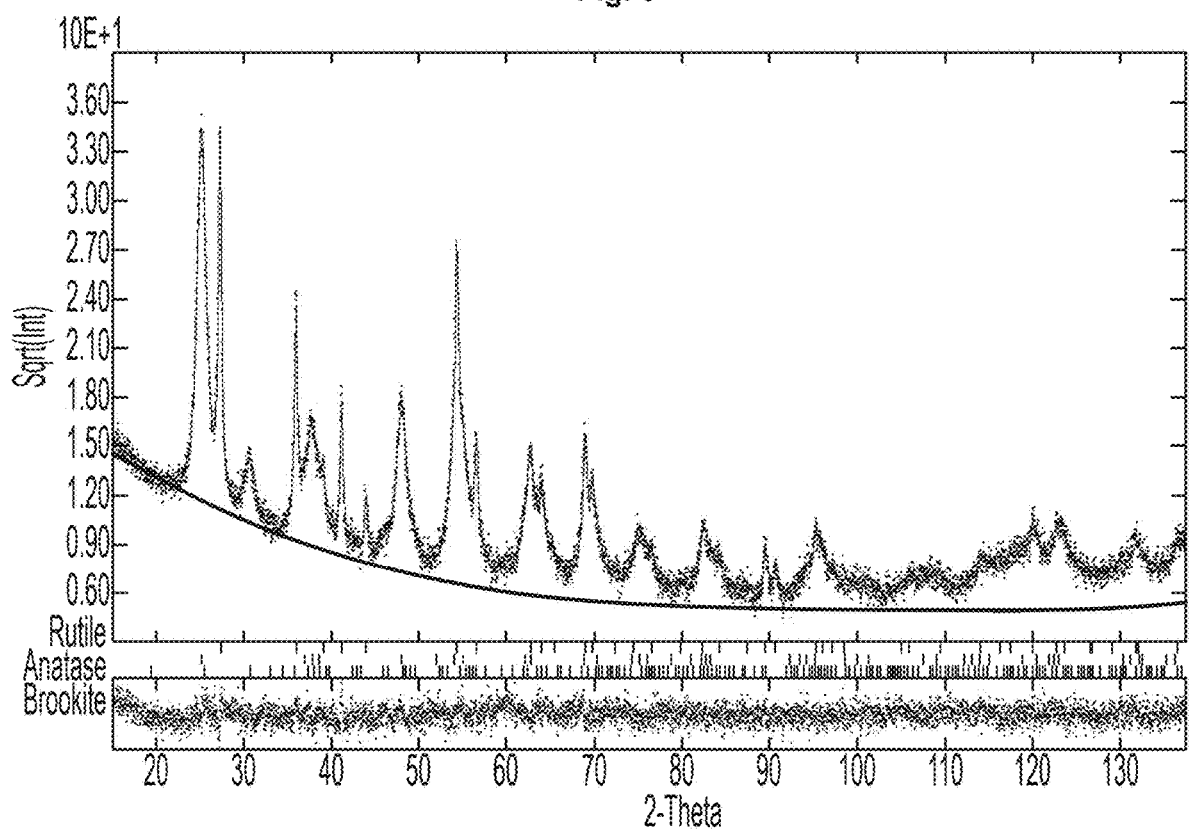
FIG. 3 shows a diffractogram of the calcined powder as per Example 2.

400 g of powder were placed in a 41×26×6 cm heat-resistant pan. The calcination was carried out with an electric muffle furnace equipped with a programmer (Nabertherm model LH60/14). The heat cycle was the following: a first step consisting of a heating ramp from room temperature to 450° C. in 2 hours with a gradient of 7° C./min., followed by a second step consisting of a 1 hour dwell time at 450° C. The recorded weight loss was 45%. The powder obtained after calcination (indicated as calcined powder) was subjected to diffractometric analysis with an X-ray diffractometer (Panalytical X'pert pro), illustrated in FIG. 3. The diffractometric analysis performed was a quantitative analysis using a Rietveld refinement method with an evaluation of the percentages of crystalline phases and crystal size. The sample has the following diffractometric concentrations in $TiO_2$.

| Crystalline phase | % by weight | Crystal size (nm) |
|---|---|---|
| Anatase | 43 | 8.0 |
| Rutile | 37 | 24.3 |
| Brookite | 20 | 7.3 |

Finally, the calcined powder was subjected to grinding with a high-energy ball mill (E-Max Retsch) in 99% ethanol at a speed of 1400 rpm for 80 minutes. The final product obtained is a suspension of monodisperse nanoparticles with a size of about 90 nm, a polydispersity index of less than 0.2 and a concentration of $TiO_2$—N equal to about 20% by weight. Lastly, the suspension was diluted with 96% ethanol in order to obtain a final $TiO_2$—N concentration in the suspension equal to 10% by weight.

Example 3

Different translucid or opaque manufactured products having a honeycomb structure (H) were produced by 3D printing. The samples produced have two sides having the same size but are distinguished by different thickness values (from 5 mm to 20 mm) and/or number/density of cells.

The samples were subjected to a pre-treatment by immersion in ethanol and subsequent drying at a temperature of 50c.

The suspension obtained as per example 2 was then applied on four samples by immersion. The excess suspension was then eliminated and the supports were subjected to a heat treatment in an oven at 50° C. for 60 minutes.

The characteristics of the manufactured products thus obtained are summarised in table 1 below.

TABLE 1

| Sample | Material | Size | Cells | CPSI | Nanoparticles $TiO_2$—N coating |
|---|---|---|---|---|---|
| HC-1 | ABS - translucid | 15 cm × 15 cm × 20 mm | 42 × 42 | 64 | 1.71 g |
| HC-2 | ABS - translucid | 15 cm × 15 cm × 10 mm | 42 × 42 | 64 | 1.24 g |
| HC-3 | ABS - translucid | 15 cm × 15 cm × 5 mm | 82 × 82 | 225 | 0.96 g |
| HC-4 | ABS - translucid | 15 cm × 15 cm × 5 mm | 42 × 42 | 64 | 0.69 g |

TABLE 1-continued

| Sample | Material | Size | Cells | CPSI | Nanoparticles TiO$_2$—N coating |
|---|---|---|---|---|---|
| HC-5 | ASA - opaque | 15 cm × 15 cm × 10 mm | 42 × 42 | 64 | 1.18 g |
| HC-6 | ASA - opaque | 15 cm × 15 cm × 20 mm | 42 × 42 | 64 | 2.37 g |
| HC-7 | ABS - translucid | 15 cm × 15 cm × 10 mm | 42 × 42 | 64 | 1.73 g |
| HC-8 | ABS - translucid | 15 cm × 15 cm × 20 mm | 42 × 42 | 64 | 1.67 g |
| HC-9 | ABS - translucid | 15 cm × 15 cm × 20 mm | 54 × 54 | 64 | 1.71 |
| HC-10 | PET-g - translucid | 15 cm × 15 cm × 10 mm | 42 × 42 | 64 | 2.54 |
| HC-11 | PET-g - translucid | 15 cm × 15 cm × 20 mm | 42 × 42 | 64 | 2.91 |
| HC-12 | PET-g - translucid | 15 cm × 15 cm × 10 mm | 42 × 42 | 64 | 2.46 |
| HC-13 | PET - translucid | 15 cm × 15 cm × 10 mm | 42 × 42 | 64 | 2.99 |
| HC-14 | COPOLYESTER - translucid | 15 cm × 15 cm × 10 mm | 42 × 42 | 64 | 2.48 |

Example 4 the manufactured product HC-1 obtained as per example 3 was analysed by SEM (Scanning Electron Microscopy, FEI model Quanta FEG 450) in order to evaluate the nanoroughness, macroroughness and thickness characteristics of the nanoparticle coating obtained by applying the suspension of TiO$_2$—N nanoparticles obtained as per Example 2.

Figure 4:
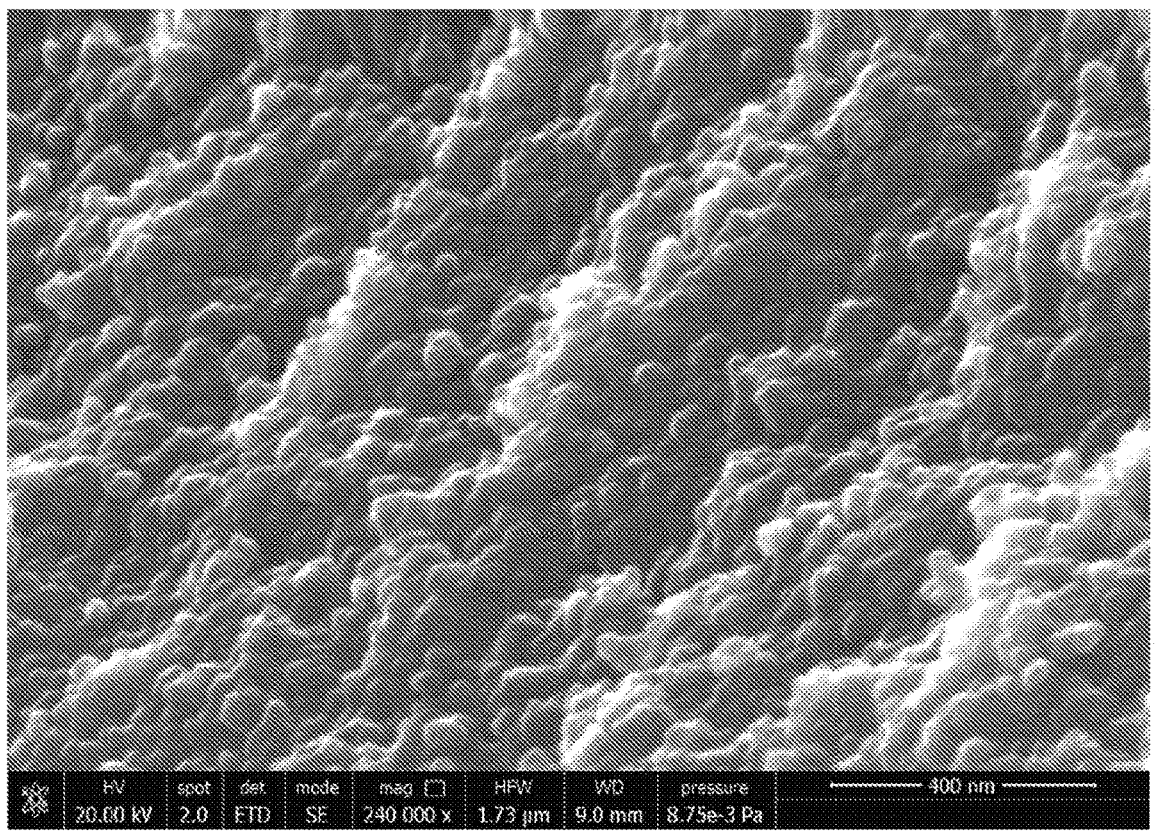
FIG. 4 shows a scanning electron microscope (SEM) image of a section of the coating of nitrogen-doped $TiO_2$ nanoparticles present on the nanofunctionalised honeycomb ABS support (HC-1) obtained as per Example 3.
Figure 4A:
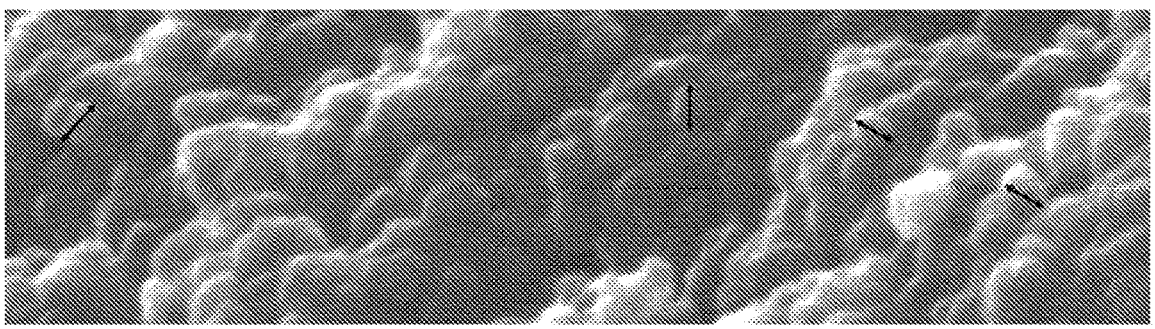
FIGS. 4a and 4b show two different magnifications of FIG. 4 (digital zoom) from which it was possible to extrapolate the nanoroughness data of the sample.
Figure 4B:
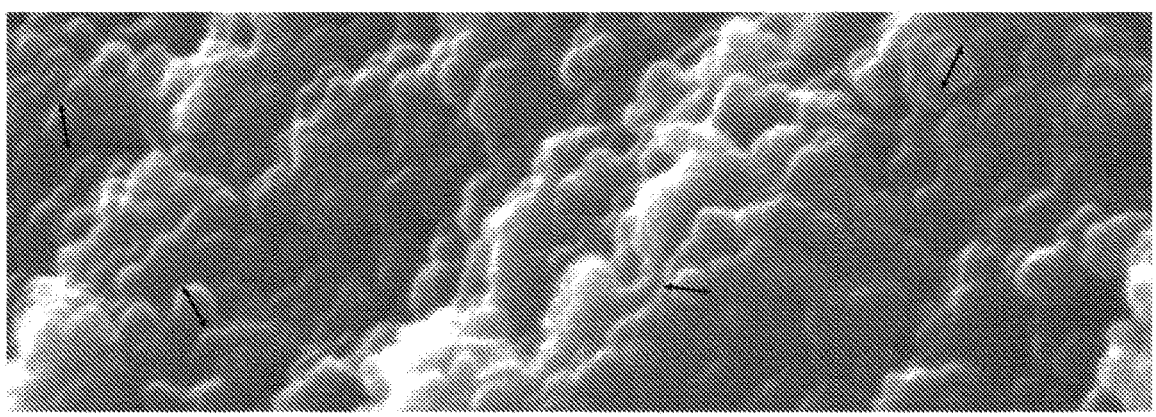

FIG. 4 shows an SEM image of a section of the coating of TiO$_2$—N nanoparticles present on the manufactured product, whereas FIGS. 4a and 4b show two different magnifications produced by digital zooming of FIG. 4, from which it was possible to extrapolate the nanoroughness data of the sample. The nanoroughness, measured in different points of the section, is summarised in the table below and shows to be comprised between 19 and 50 nm, centred around an average value of 35 nm.

TABLE 2

| | Nanoroughness |
|---|---|
| 1 | 19 nm |
| 2 | 30 nm |
| 3 | 27 nm |
| 4 | 24 nm |
| 5 | 50 nm |
| 6 | 41 nm |
| 7 | 45 nm |
| 8 | 45 nm |

Figure 5:
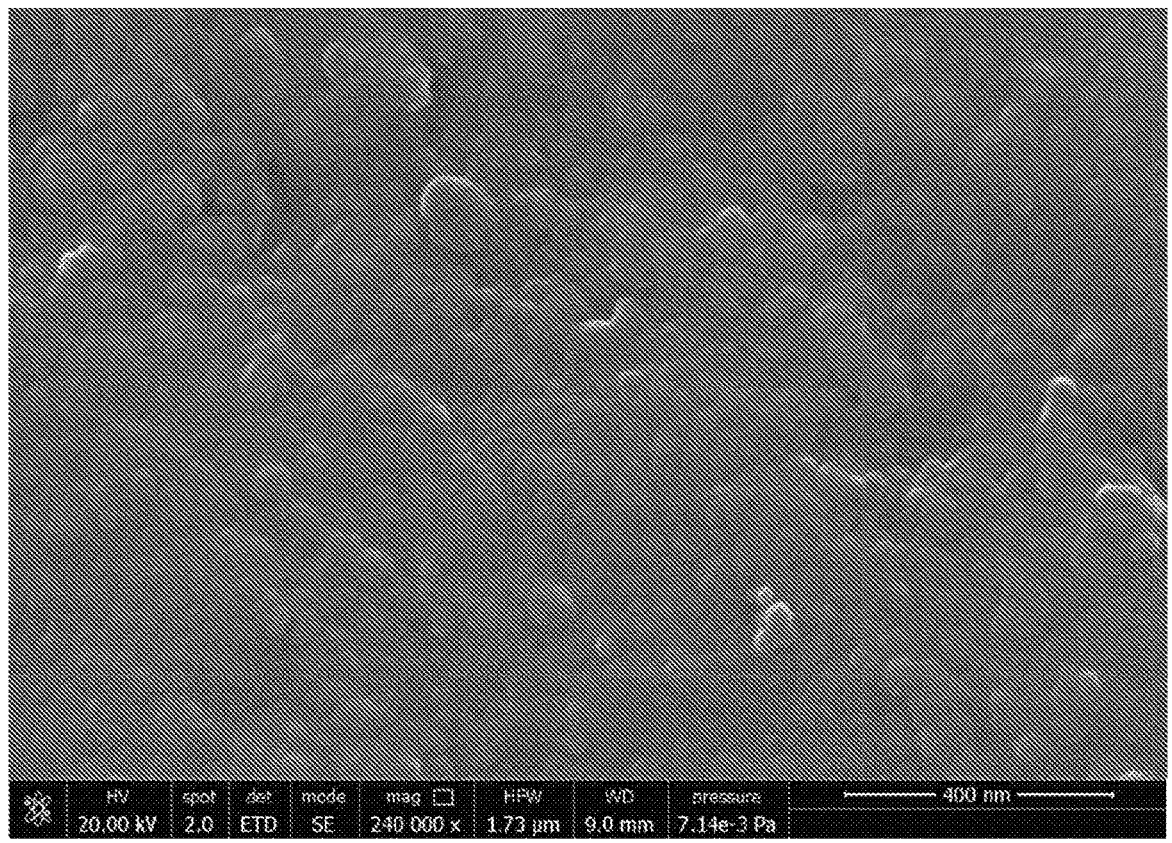
FIG. 5 shows a scanning electron microscope (SEM) image of a section of the coating of nitrogen-doped $TiO_2$ nanoparticles present on the nanofunctionalised honeycomb ABS support (HC-1) obtained as per Example 3, measured in a different point of the sample.
Figure 5A:
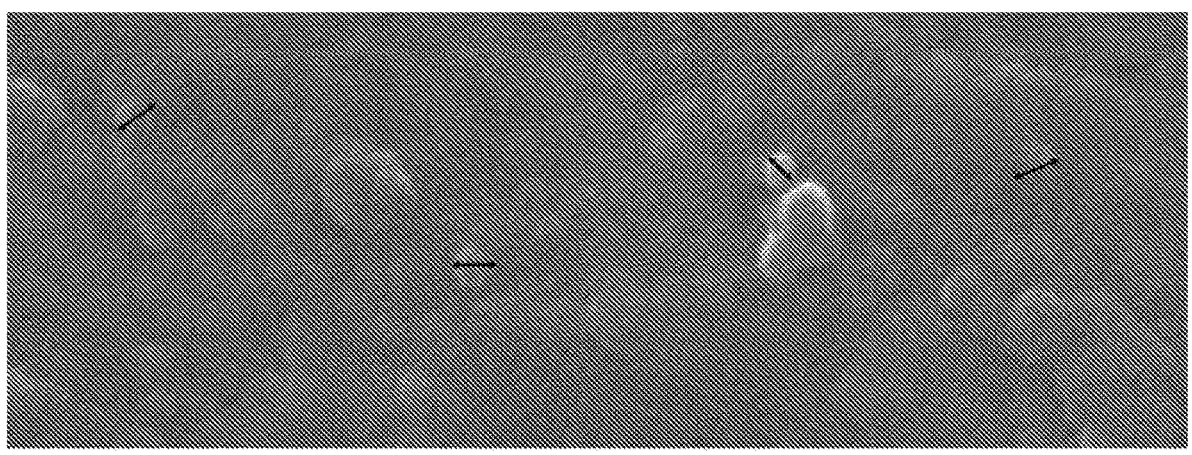
FIG. 5a shows a magnification of FIG. 5 (digital zoom), from which it was possible to extrapolate the nanoroughness data of the sample.

The nanoparticle coating was further observed also on the surface. SEM images of the surface of the TiO$_2$—N coating are shown in FIG. 5 and in FIG. 5a (magnification thereof). In this case as well, it was possible to extrapolate the nanoroughness values, measured in different points of the section and summarised in the table below.

TABLE 3

| | Nanoroughness |
|---|---|
| 1 | 44 nm |
| 2 | 26 nm |
| 3 | 28 nm |
| 4 | 36 nm |

The observed values are consistent with those observed for the section and in this case are comprised between 26 and 44 nm, centred around an average value of 33 nm.

Figure 6:
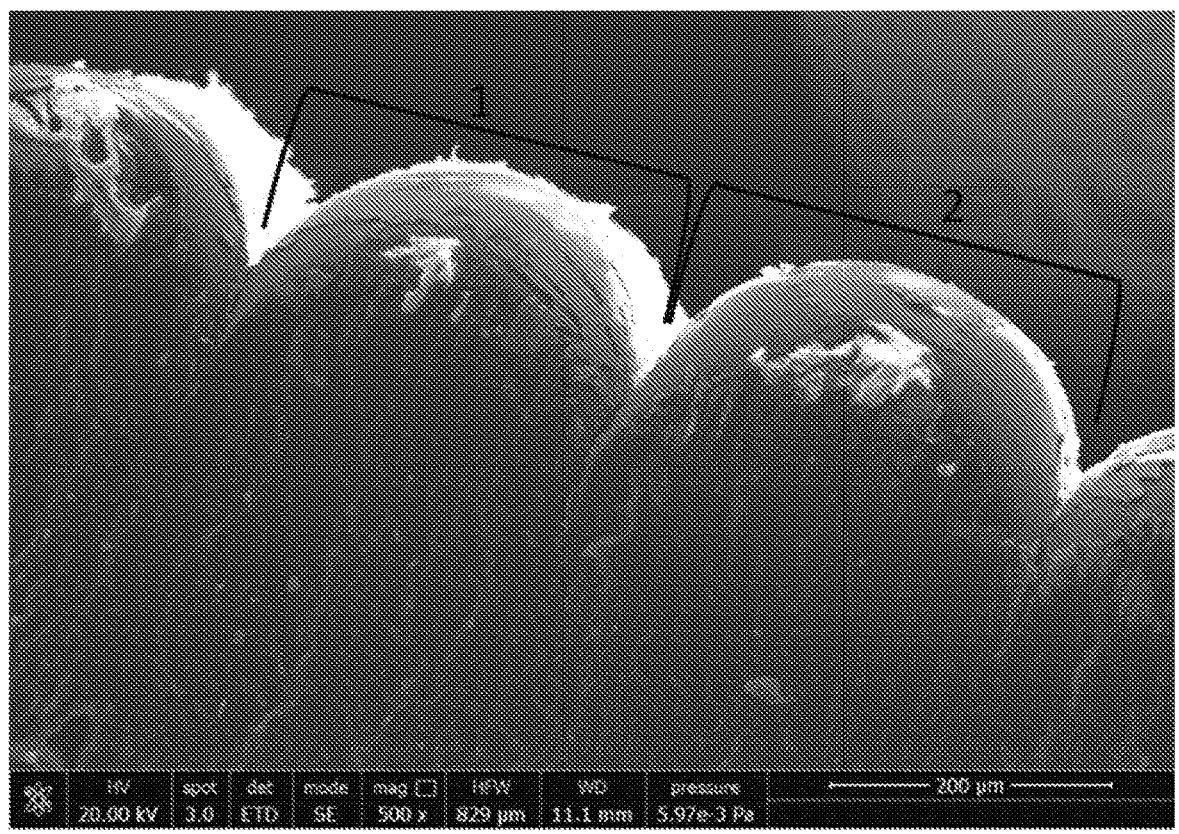
FIG. 6 shows a scanning electron microscope (SEM) image of a section obtained by cryofracture in liquid $N_2$ of the nanofunctionalised honeycomb ABS support (HC-1) obtained as per Example 3; it shows the characteristic macroroughness highlighted by the arrows (1) and (2), which indicate the distance between one protuberance and the next, that can be likened to the distance between one valley and the next.
Figure 6A:
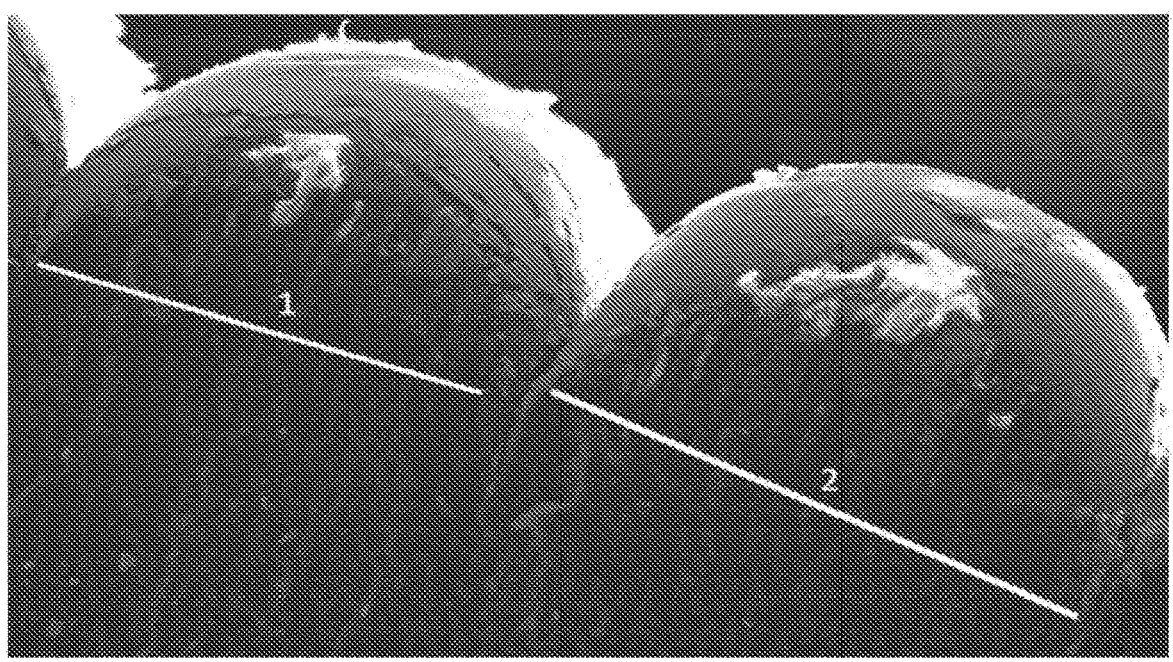
FIG. 6a shows a magnification of FIG. 6 (digital zoom), from which it was possible to extrapolate the macroroughness data (i.e. the numerical values in terms of μm) of the sample highlighted therein by the arrows (1) and (2).

With regard to the analysis of macroroughness, this was carried out by evaluating the section of the manufactured product HC-1 obtained by cryofracture in liquid N$_2$. FIGS. 6 and 6a show SEM images obtained at two different magnifications, from which it was possible to extrapolate the macroroughness data of the sample. The macroroughness values collected for two points of the sample, which showed to be equal to 253 and 308 μm, are given by way of example. In view of the repetitiveness of the structuring of the manufactured product resulting from the 3D printing technique, it is possible to maintain that the macroroughness data are significant also for other points of the sample and thus actually represent the macroroughness values of the manufactured product.

Figure 6B:
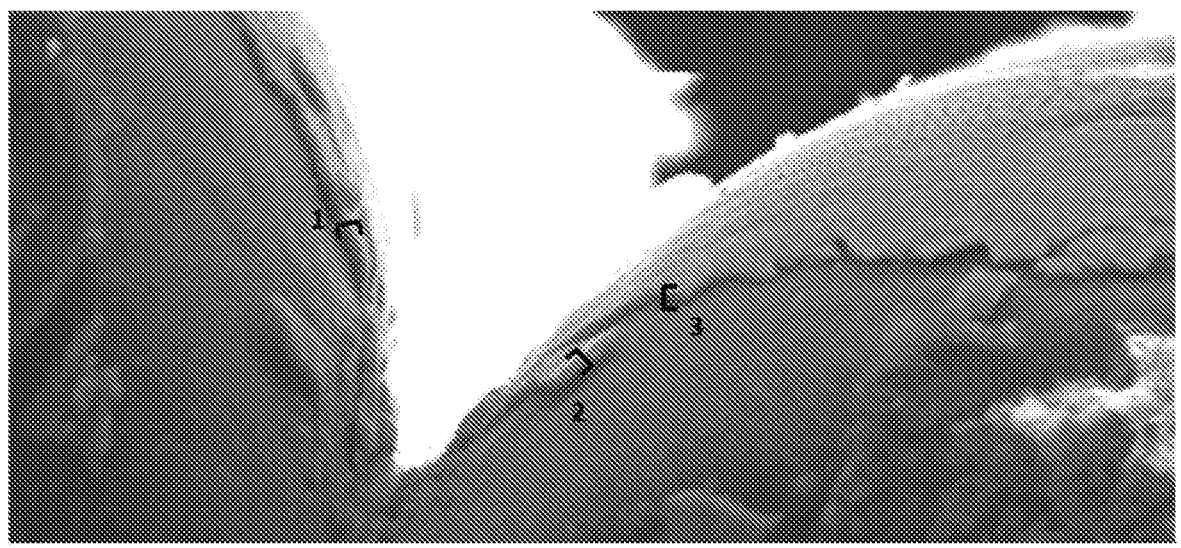
FIG. 6b shows a further magnification of FIG. 6 (digital zoom), from which it was possible to extrapolate the thickness data of the coating of nitrogen-doped $TiO_2$ nanoparticles present on the nanofunctionalised honeycomb ABS support (HC-1) obtained as per Example 3.

FIG. 6b, by contrast, shows a further magnification of FIG. 6, produced by digital zooming, from which it was possible to extrapolate the data relating to the thickness of the coating of TiO$_2$—N nanoparticles present on the manufactured product. The thickness was measured in three significant points, shown in the figure, and was equal to 1.65 μm and 2.30 μm.

Figure 7:
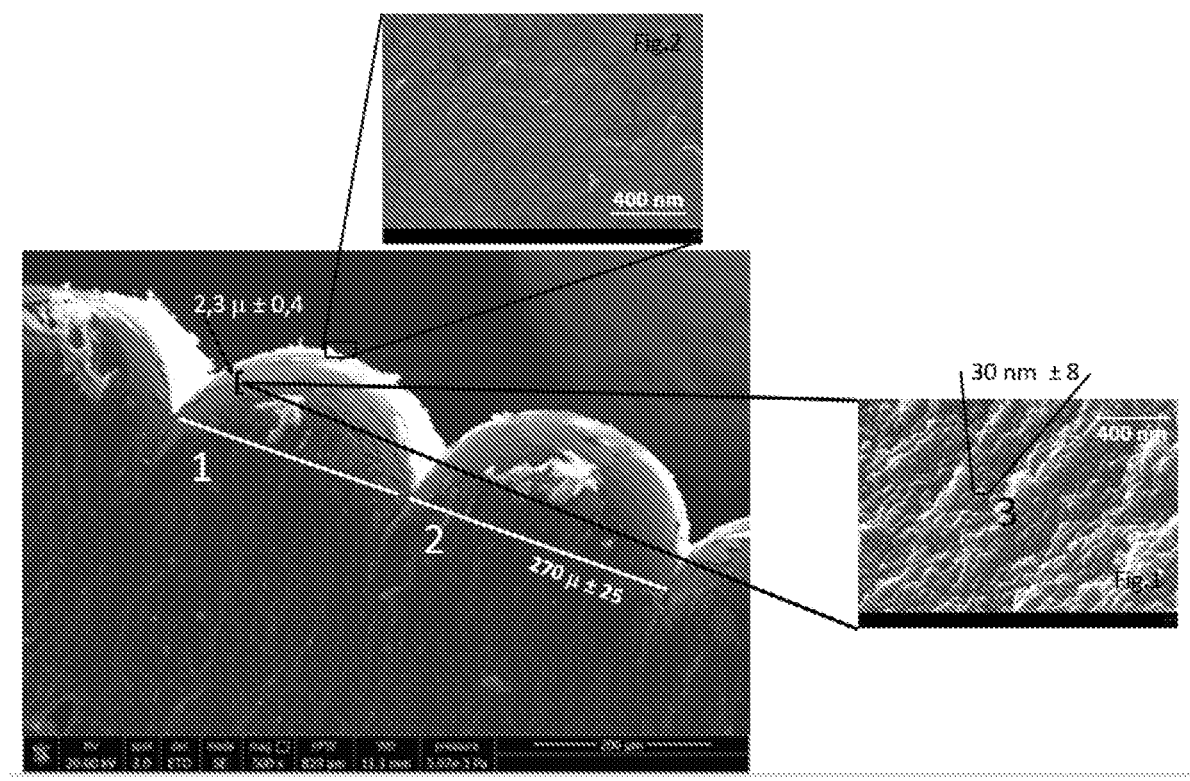
FIG. 7 shows a summary diagram showing the SEM images from which it was possible to extrapolate the thickness data of the coating, and the nanoroughness (3) and macroroughness (1), (2) data related to the nanofunctionalised honeycomb ABS support (HC-1) obtained as per Example 3 and indicated in the figure by arrows and squares.

The above-mentioned analyses, along with the respective instrument measurement errors, are summarised in FIG. 7.

Example 5: Comparative Experiments

Tests were performed on the manufactured products HC-1, HC-2, HC-3 and HC-4, obtained as per example 3, to evaluate the abatement of pollutants (NO$_x$) by measuring the concentration (expressed in ppbv) as a function of time following irradiation with an LED with a colour temperature of 3000K.

The results obtained were compared with those obtained, under the same irradiation conditions, for a ceramic manufactured product, likewise nanofunctionalised with a nanoparticle coating of TiO$_2$—N nanoparticles. In this case, however, the ceramic manufactured product was functionalised in accordance with the procedure described in patent application WO2018/207107, of the same Applicant, which comprises the following steps:

97.00 g of suspension obtained as per example 1 and 4.07 g of ammonium citrate were mixed in a 200 ml beaker and the temperature was set at 25° C.; after 24 hours of mixing a white opalescent solution was formed, with a concentration of 5.76% by weight of titanium dioxide and 0.49% by weight of nitrogen. 90.0 g of said suspension were then applied with the flow-coating technique on a ceramic manufactured product with a honeycomb structure and a size of 15 cm×15 cm×20 mm and having a number of cells equal to 42×42 and a CPSI of 64. The manufactured product thus prepared (HC-REF) was subjected to a firing cycle in a continuous electric oven at 500° C. for 3 hours with a belt speed set on 4 m/h. After firing the amount of titanium dioxide doped with deposited nitrogen was 5.23 g.

Figure 9:
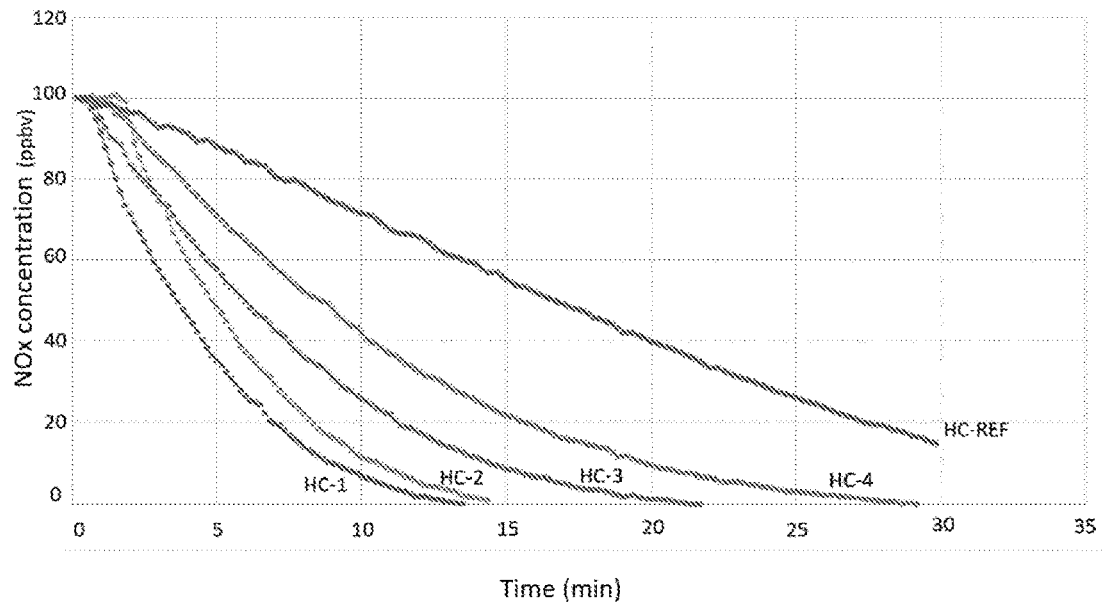
FIG. 9 shows a graph of the trend in the abatement of pollutants ($NO_x$) by irradiation, with an LED at 3000 K, as described in Example 5. The results obtained for the honeycomb supports nanofunctionalised with a coating of $TiO_2$—N nanoparticles according to the present invention (HC-1, HC-2, HC-3 and HC-4) are compared with those obtained with a ceramic honeycomb support of the prior art (HC-REF), likewise coated with nitrogen-doped titanium dioxide nanoparticles.
Figure 10:
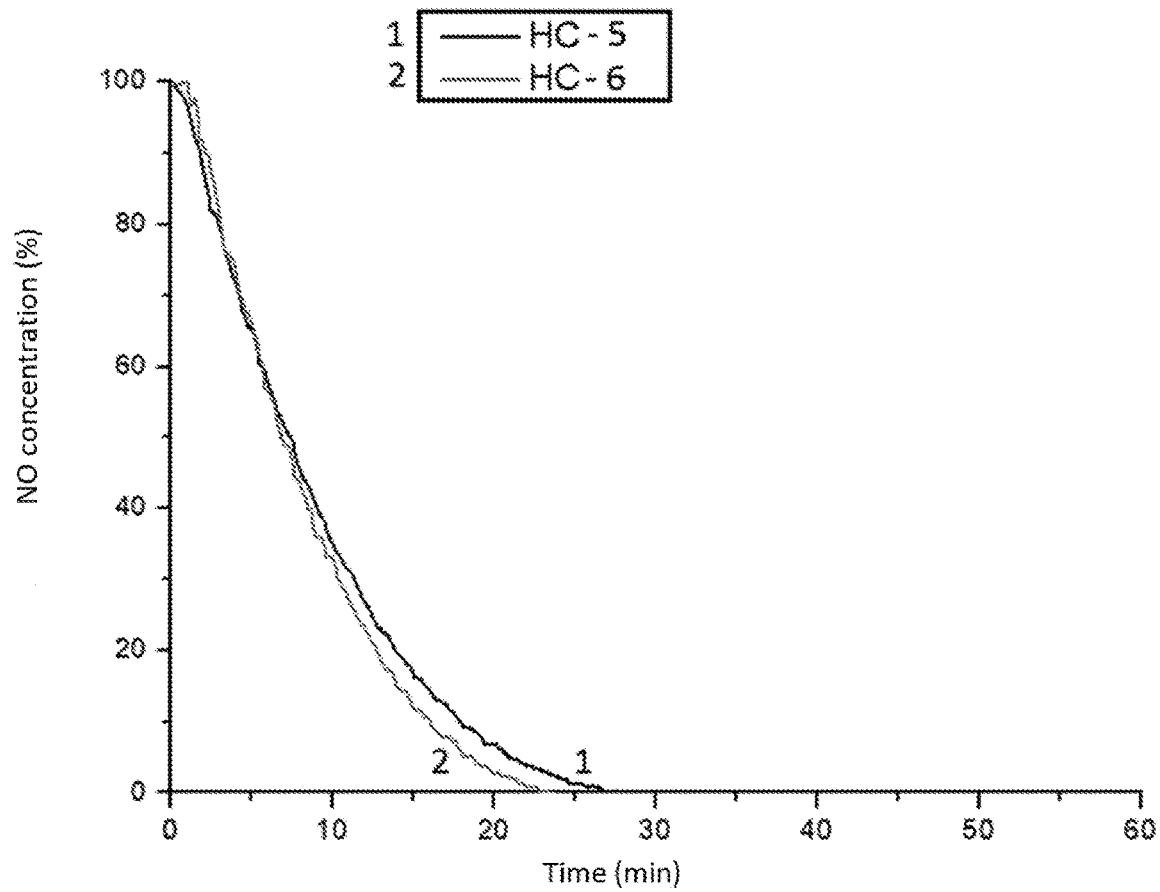
FIG. 10 shows a graph of the trend in the abatement of pollutants (NO) by irradiation, with an LED at 3000 K, of the honeycomb supports nanofunctionalised with a coating of $TiO_2$—N nanoparticles according to the present invention HC-5 and HC-6 obtained as described in Example 3 and tested as described in Example 6.
Figure 11:
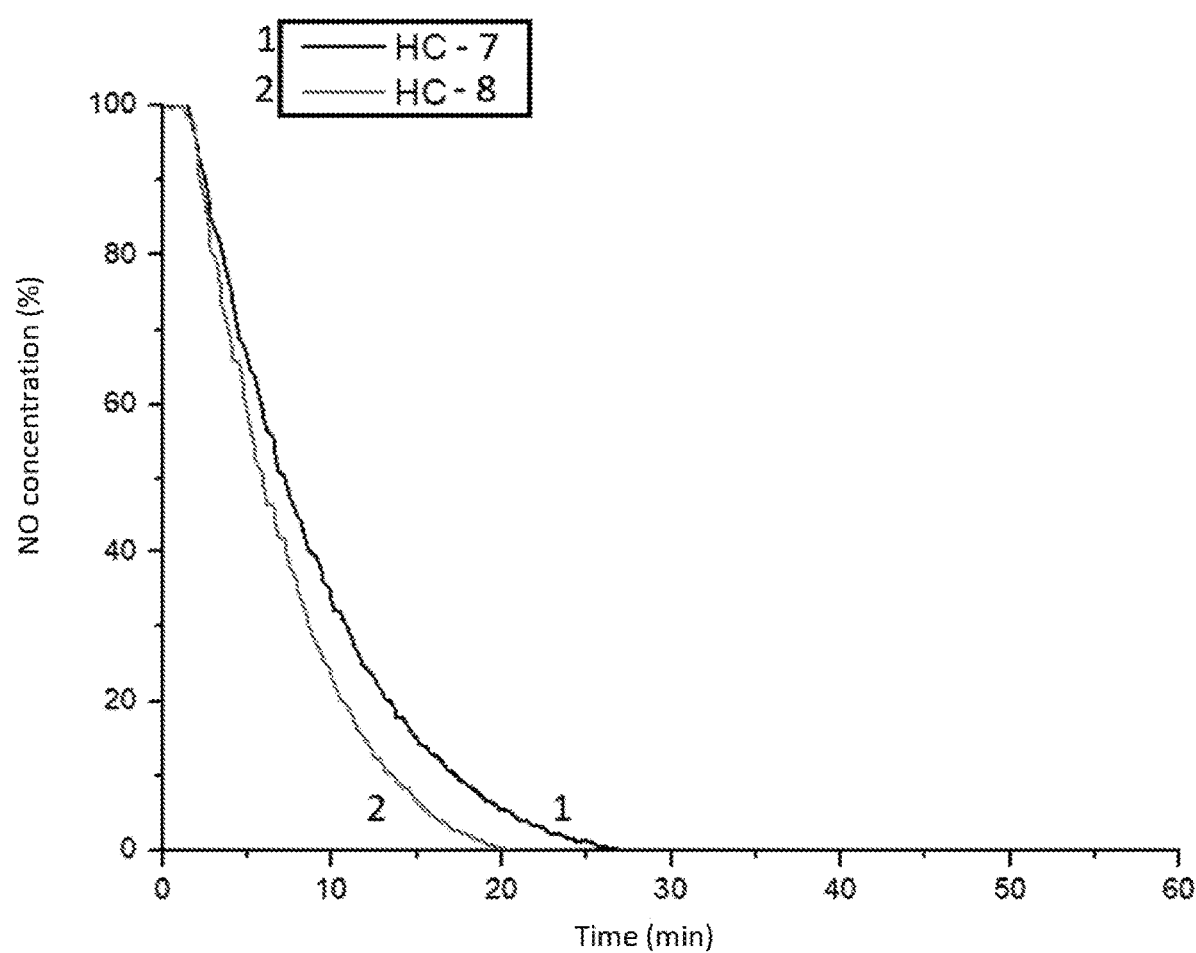
FIG. 11 shows a graph of the trend in the abatement of pollutants (NO) by irradiation, with an LED at 3000 K, of the honeycomb supports nanofunctionalised with a coating of $TiO_2$—N nanoparticles according to the present invention HC-7 and HC-8 obtained as described in Example 3 and tested as described in Example 6.
Figure 12:
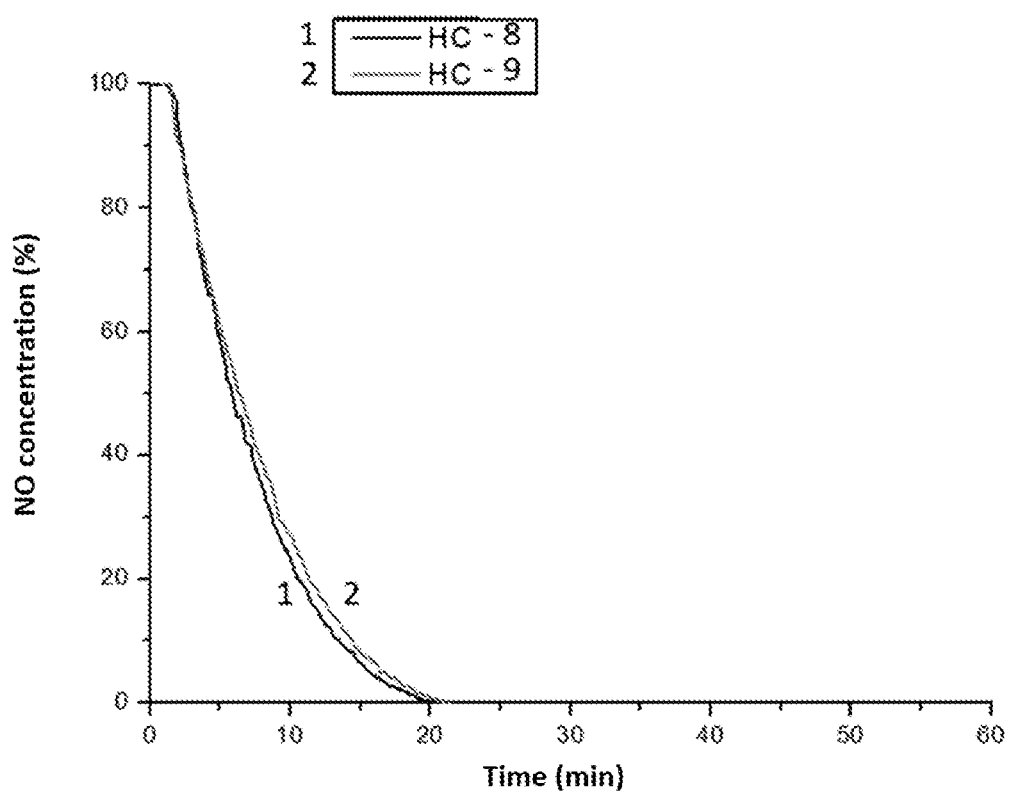
FIG. 12 shows a graph of the trend in the abatement of pollutants (NO) by irradiation, with an LED at 3000 K, of the honeycomb supports nanofunctionalised with a coating of $TiO_2$—N nanoparticles according to the present invention HC-8 and HC-9 obtained as described in Example 3 and tested as described in Example 6.
Figure 13:
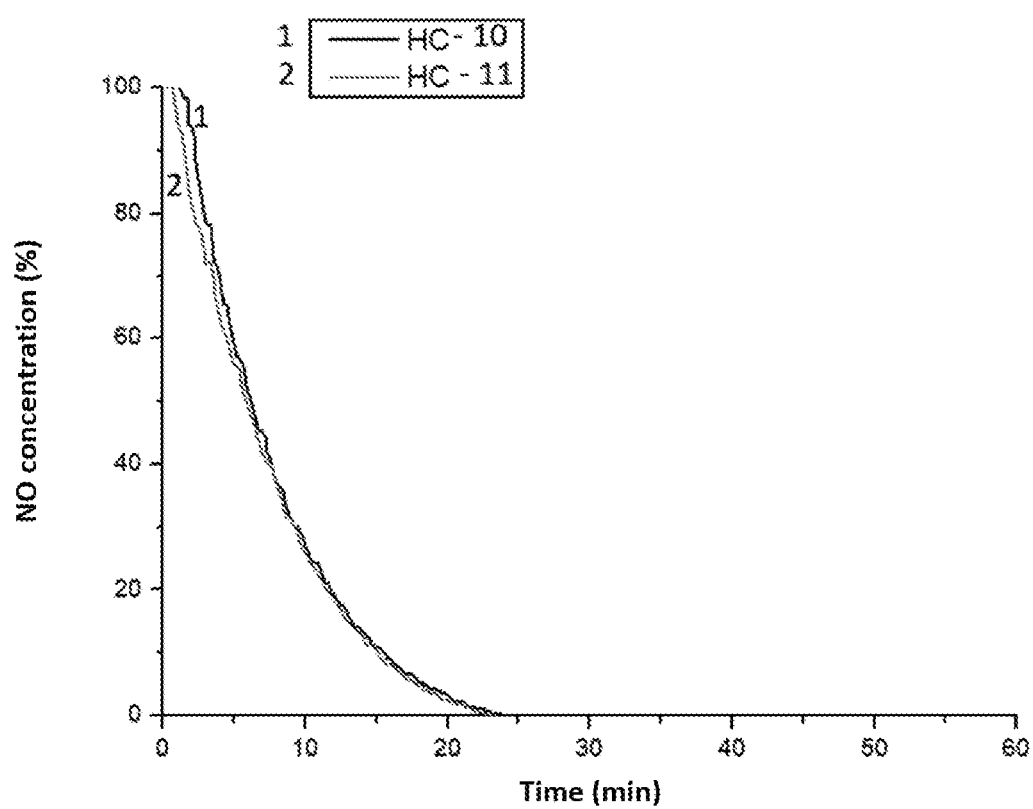
FIG. 13 shows a graph of the trend in the abatement of pollutants (NO) by irradiation, with an LED at 3000 K, of the honeycomb supports nanofunctionalised with a coating of $TiO_2$—N nanoparticles according to the present invention HC-10 and HC-11 obtained as described in Example 3 and tested as described in Example 6.
Figure 14:
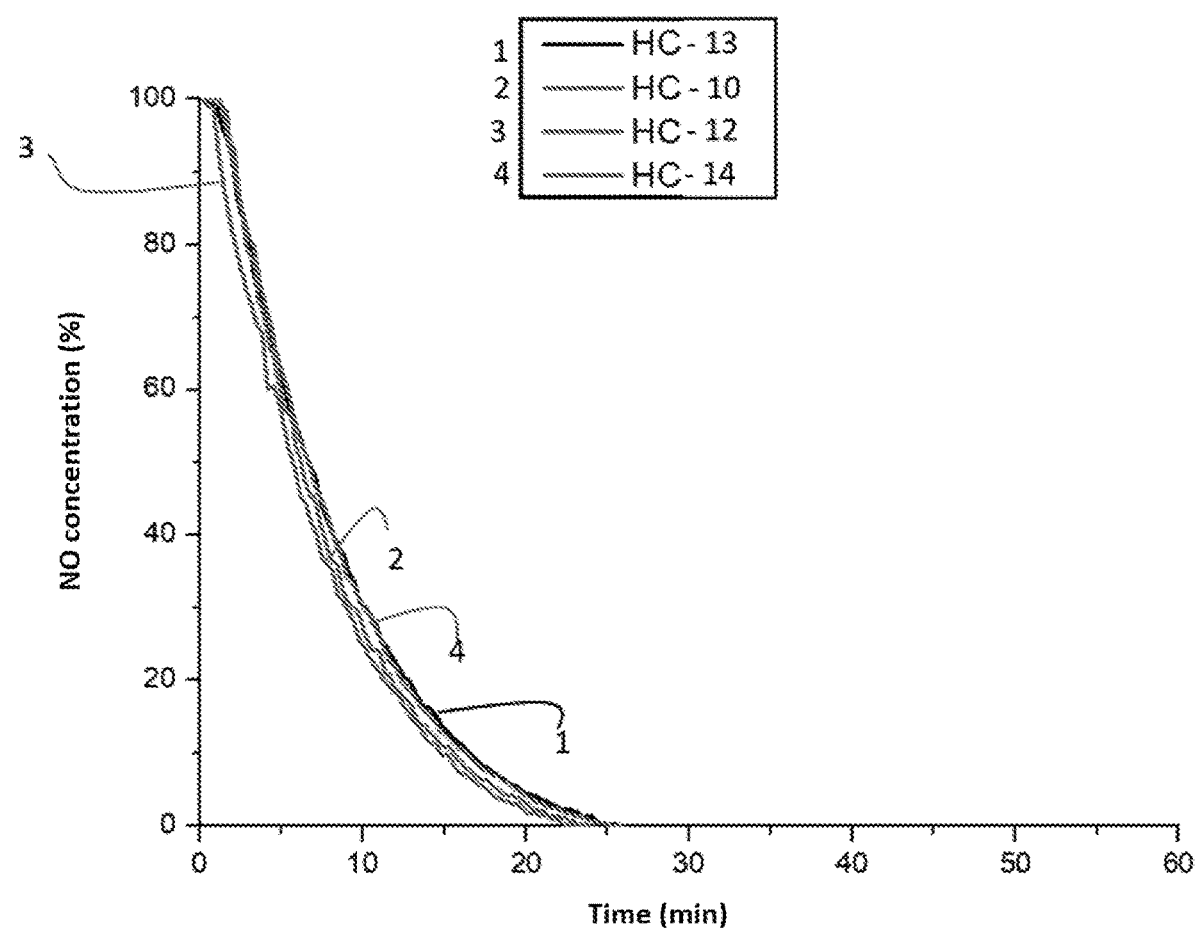
FIG. 14 shows a graph of the trend in the abatement of pollutants (NO) by irradiation, with an LED at 3000 K, of the honeycomb supports nanofunctionalised with a coating of $TiO_2$—N nanoparticles according to the present invention HC-10, HC-12, HC-13 and HC-14 obtained as described in Example 3 and tested as described in Example 6.

The results obtained for the various samples are shown in FIG. 9. The trends in NO$_x$ abatement shown for the various samples tested clearly show that, in the case of the nanofunctionalised manufactured products of the present invention, the efficiency is distinctly greater compared to the ceramic manufactured product of the prior art. In particular, if one wishes to compare the manufactured product with the lowest performance among those of the present invention, i.e. the manufactured product HC-4 having a thickness of 5 mm and an amount of deposited TiO$_2$—N of 0.69 g, the latter in any case shows to be much more efficient in terms of NO$_x$ abatement under irradiation with LED light compared to a ceramic manufactured product having an even greater thickness (20 mm) and a larger amount of photocatalytic nanoparticles deposited thereon. If one wishes to instead compare two manufactured products having the same dimensions (same thickness), in this case, the manufactured product of the present invention HC-1 (20 mm of thickness and 1.71 g of deposited TiO$_2$—N nanoparticles) has an efficiency that is 5-6 times greater than that of the ceramic manufactured product having the same dimensions and having an even larger amount of deposited photocatalytic nanoparticles (HC-REF).

Example 6: Comparative Examples

Tests were performed on the manufactured products HC-5, HC-6, HC-7 and HC-8, HC-9, HC-10, HC-11, HC-12, HC-13, HC-14, obtained as per example 3, to evaluate the abatement of pollutants (NO) by measuring the concentration (expressed in ppbv) as a function of time following irradiation with an LED with a colour temperature of 3000K. The results are shown in FIGS. 10-14 and show good photocatalytic performances for all the manufactured products.

Figure 15:
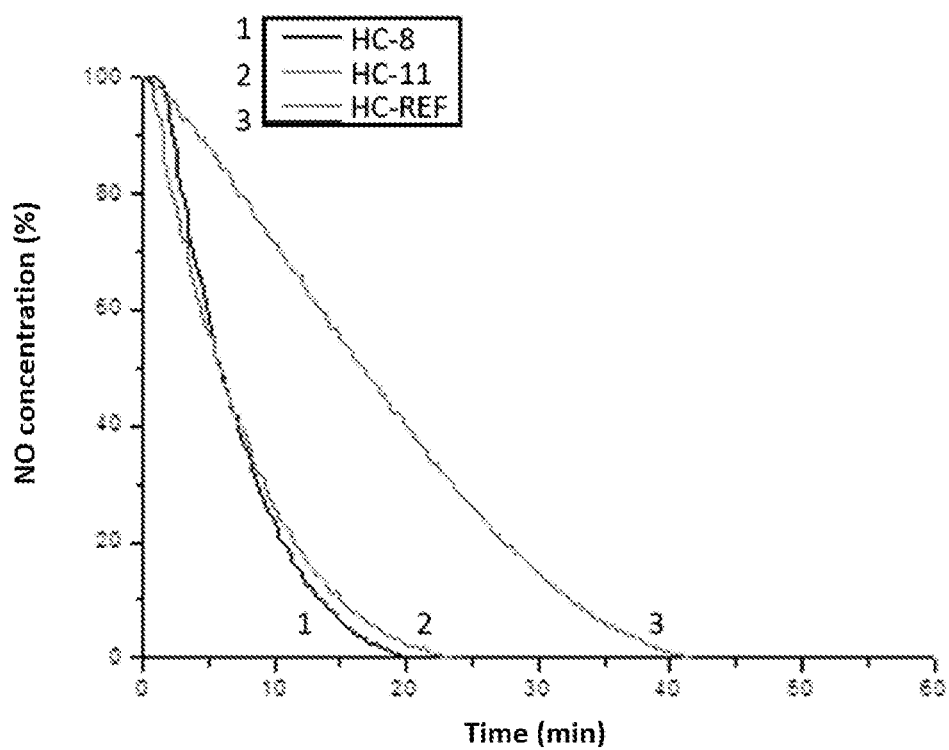
FIG. 15 shows a graph of the trend in the abatement of pollutants (NO) by irradiation, with an LED at 3000 K, as described in Example 6. The results obtained for the honeycomb supports nanofunctionalised with a coating of $TiO_2$—N nanoparticles according to the present invention (HC-8 and HC-11) are compared with those obtained with a ceramic honeycomb support of the prior art (HC-REF), likewise coated with nitrogen-doped titanium dioxide nanoparticles.
Figure 16:
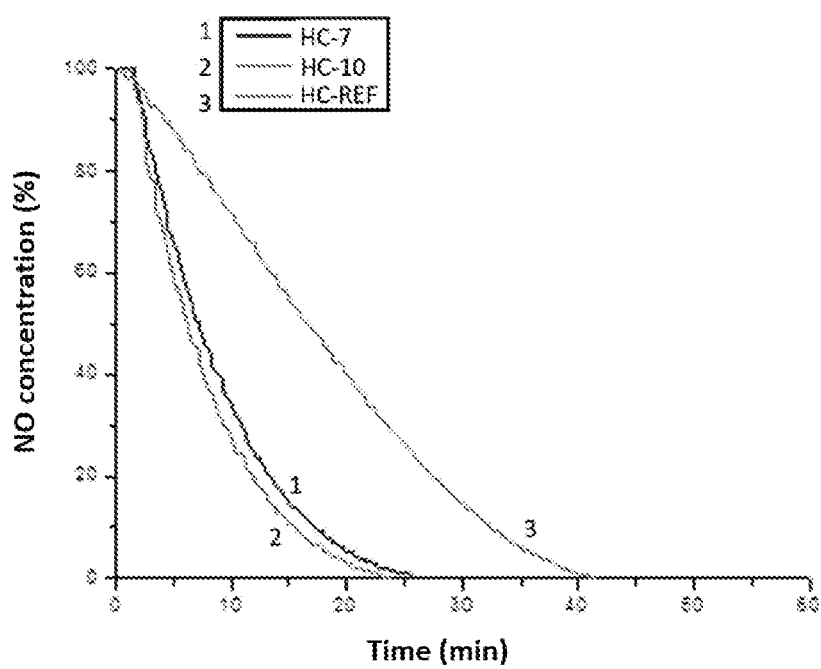
FIG. 16 shows a graph of the trend in the abatement of pollutants (NO) by irradiation with an LED at 3000 K, as described in Example 6. The results obtained for the honeycomb supports nanofunctionalised with a coating of $TiO_2$—N nanoparticles according to the present invention (HC-7 and HC-10) are compared with those obtained with a ceramic honeycomb support of the prior art (HC-REF), likewise coated with nitrogen-doped titanium dioxide nanoparticles.
Figure 17:
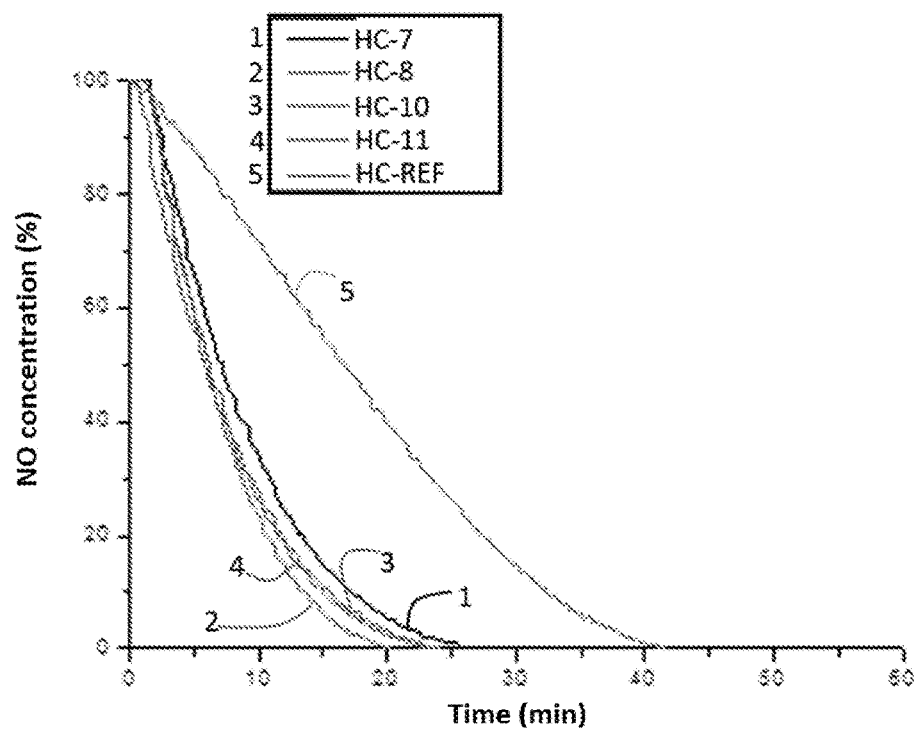
FIG. 17 shows a graph of the trend in the abatement of pollutants (NO) by irradiation with an LED at 3000 K, as described in Example 6. The results obtained per the honeycomb supports nanofunctionalised with a coating of $TiO_2$—N nanoparticles according to the present invention (HC-7, HC-8, HC-10 and HC-11) are compared with those obtained with a ceramic honeycomb support of the prior art (HC-REF), likewise coated with nitrogen-doped titanium dioxide nanoparticles.

FIGS. 15, 16 and 17 show graphs of the trend for the manufactured products HC-7, HC-8, HC-10 and HC-11 of the present invention compared with the results obtained when irradiating, under the same conditions, the ceramic manufactured product HC-REF (a detailed description of which is provided in Example 5).

In this case as well, the trends in the abatement of NO reported for the various samples tested clearly show that, in the case of the nanofunctionalised manufactured products of the present invention, the efficiency is distinctly greater compared to the ceramic manufactured product of the prior art.

Example 7: Comparative Examples

A translucid manufactured product made of ABS and having a cuboidal shape, with a size of 105 mm×105 mm×2 mm and a macroroughness, as measured by SEM, that is essentially absent, i.e. less than 10 µm (in other words a manufactured product that can be considered "smooth"), was prepared by means of the injection moulding technique ("SAMPLE-S").

A second translucid manufactured product made of ABS, with the same cuboidal shape and size was prepared by means of 3D printing according to the present invention ("SAMPLE-R"). Said manufactured product has a macroroughness of 270 µm, as measured by SEM (in other words a manufactured product that can be considered "rough").

Both manufactured products were then initially pretreated by washing with 96% ethanol and allowed to dry in an oven at 50° C. They were subsequently functionalised by applying the suspension obtained as per example 2 with the "flow-coating" technique. The manufactured products were then subjected to heating cycle at 50° C. in a ventilated oven for 1 hour. The amount of nanoparticles deposited on the manufactured product "SAMPLE-S" was 4 g/m$^2$, whereas the amount deposited on the manufactured product "SAMPLE-R" of the present invention was 19 g/m$^2$.

Figure 18:
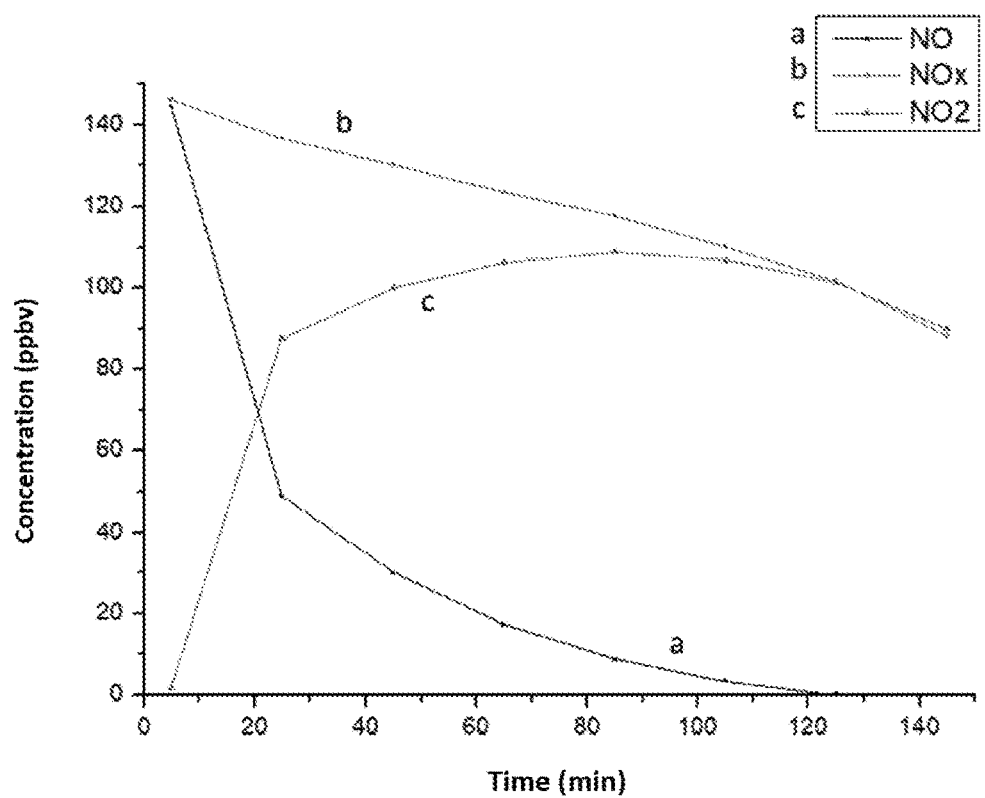
FIG. 18 shows a graph of the trend in the abatement of pollutants (NO, $NO_x$ and $NO_2$) by irradiation, with an LED at 3000 K, of a nanofunctionalised ABS support with a cuboid-shaped structure with a coating of $TiO_2$—N nanoparticles having a macroroughness of less than 10 μm ("SAMPLE-S"), as described in Example 7.

A test was then performed on the samples thus obtained to determine the abatement of pollutants (NO, NO$_x$ and NO$_2$) using an LED system at 3000K as the light source. The two tests, respectively for the "smooth" sample and the "rough" sample of the present invention, are shown in FIGS. 18 and 19. In this case as well, the better performances of the manufactured product of the present invention appear clear when compared to those of a manufactured product having different characteristics, in this case having a distinctly lower macroroughness value and, therefore, a lower capacity of the photocatalytic nanoparticles in terms of adhesion/functionalisation.

The invention claimed is:

1. A manufactured product nanofunctionalized with photocatalytic nanoparticles, said manufactured product being a manufactured product made of polymeric material characterized by a nanoroughness (3), measured by means of an electron microscope, comprised between 10 and 150 nm and a macroroughness (1), (2), measured by means of an electron microscope, comprised between 100 and 600 µm, wherein said nanoroughness and macroroughness are diffused internally and/or superficially, and wherein said photocatalytic nanoparticles are present within said polymeric material and/or in the form of a nanoparticle coating on at least one inner an/or outer surface of said product,
   wherein said photocatalytic nanoparticles are nitrogen-doped TiO$_2$ (TiO$_2$—N) nanoparticles comprising at least one brookite crystalline phase in an amount of 10 to 99% by weight relative to the weight of the nanoparticles and a rutile crystalline phase in an amount of 25 to 90% by weight relative to the weight of the nanoparticles.

2. The nanofunctionalized manufactured product according to claim 1, wherein said nanoroughness (3) is comprised between 10 and 50 nm and said macroroughness (1), (2), is comprised between 200 and 300 µm.

3. The nanofunctionalized manufactured product according to claim 1, wherein said polymeric material comprises at least one (co) polymer selected from among: polymethylmethacrylate (PMMA), polyamide (PA), polycarbonate (PC), polylactic acid (PLA), polyethylene terephthalate (PET), polyethylene (PE), polyvinyl chloride (PVC), polystyrene (PS), acrylonitrile styrene acrylate (ASA), acrylonitrile butadiene styrene (ABS), polyethylene terephthalate glycol (PET-g), polyurethane (PU), polypropylene (PP), copolyester, and combination thereof.

4. The nanofunctionalized manufactured product according to claim 1, wherein said photocatalytic nanoparticles further comprise nanoparticles selected from the group consisting of: $TiO_2$, $TiO_2$ doped with an element selected from a transition metal selected from among Cu, Ni, Co, Mn, Fe, Cr, Mo, V, W, Y and Sc, a noble metal selected from among Au, Ag and Pt, an element of the rare earth group selected from among Ce, La, Pr, Nd, Te and Yb, a non-metal selected from among C, N, P, S and F, and a combination thereof.

5. The nanofunctionalized manufactured product according to claim 1, wherein said photocatalytic nanoparticles are present in an amount comprised between 1 and 10 $g/m^2$.

6. The nanofunctionalized manufactured product according to claim 1, wherein said nanoparticles of TiO2-N further comprise an anatase crystalline phase in an amount of 1 to 10% by weight or 25 to 90% by weight relative to the weight of the nanoparticles.

7. The nanofunctionalized manufactured product according to claim 1, wherein said photocatalytic nanoparticles coating has a thickness, measured by means of an electron microscope, comprised between 1 and 5 μm.

8. The nanofunctionalized manufactured product according to claim 1, comprising a plurality of channels and/or cells suitable for the passage of a fluid, said channels and/or cells having a cross-section selected from among circular, hexagonal, square, triangular, rectangular and a combination thereof, and identifying a path for the fluid having a variable geometry, said path being selected from among linear, tortuous, spiral or a combination thereof.

9. The nanofunctionalized manufactured product according to claim 1, having a structure selected from among: a layered structure, an interwoven mesh structure, a woven fabric structure, a honeycomb structure and a combination thereof.

10. The nanofunctionalized manufactured product according to claim 9, wherein the honeycomb structure is characterized by a CPSI value comprised between 40 and 120.

11. The nanofunctionalized manufactured product according to claim 1, comprising at least two layers having a structure selected from among a layered structure, an interwoven mesh structure, a woven fabric structure, a honeycomb structure and a combination thereof, said at least two layers being joined to each other by means of an interlock mechanism or with a plug system.

12. The nanofunctionalized manufactured product according to claim 1, having a cylindrical structure, said cylindrical structure having an average diameter of between 0.1 and 10 mm and an average height comprised between 1 and 50 mm.

13. The nanofunctionalized manufactured product comprised a plurality of nanofunctionalized manufactured products having a cylindrical structure according to claim 12.

14. The nanofunctionalized manufactured product according to claim 1, wherein said manufactured product is opaque, translucid or transparent.

15. A process for preparing a nanofunctionalized manufactured product according to claim 1, comprising the steps of:

(a) preparing a manufactured product made of polymeric material having at least one inner and/or outer surface by means of 3D printing, injection moulding or extrusion of a polymeric material, said polymeric material possibly being a polymeric material comprising photocatalytic nanoparticles within it;

(b) applying, on the at least one inner and/or outer surface of the manufactured product obtained in step (a), a suspension of photocatalytic nanoparticles, wherein said nanoparticles are present in the suspension at a concentration comprised between 1 and 30% weight/weight, by means of a technique selected in the group consisting of: "spray coating", "flow coating", "dip coating", "spin coating", Meyer bar coating", "gravure coating", "knife coating", "kiss coating", "die coating", and "film transfer", with the condition that, if the photocatalytic nanoparticles are present within the polymeric material of step (a), step (b) can optionally be omitted.

16. The process according to claim 15, further comprising, before (b), a step (b') of pre-activating the manufactured product obtained in step (a) by immersion in an organic solvent, preferably acetone, ethyl alcohol, isopropyl alcohol, methyl alcohol and a combination thereof, for a time comprised between 0.1 and 50 minutes, and a subsequent heat treatment at a temperature comprised between 3° and 60° C.

17. The process according to claim 15, further comprising, after step (b), a step (c) of subjecting the manufactured product obtained to a heat treatment at a temperature comprised between 3° and 90° C., for time comprised between 0.5 and 3 hours.

18. A method of decontaminating a fluid comprising contacting a fluid, wherein said fluid is air and/or water, with the nanofunctionalized manufactured product according to claim 1, and activating the photocatalytic nanoparticles with UV and/or visible light and/or sunlight to decontaminate the fluid from contaminants, said contaminants being selected from among $NO_x$, COV, swine orthopneumovirus (SOV), bacteria, moulds, odours and a combination thereof.

19. A filtration device for decontaminating a fluid, wherein said fluid is air and/or water, from organic contaminants, comprising at least one nanofunctionalized manufactured product according to claim 1 associated with at least one light source, said light source being configured to emit radiation in the UV and/or visible light spectrum and to irradiate said at least one nanofunctionalized manufactured product.

20. The filtration device according to claim 19, further comprising at least one ventilation and/or distribution system for a fluid, wherein said fluid is air and/or water, configured to enable the passage of said fluid inside the filtration device itself, favouring the contact thereof with and/or the passage thereof through the at least one nanofunctionalized manufactured product.

21. The filtration device according to claim 19, wherein said at least one nanofunctionalized manufactured product completely surrounds and/or incorporates said at least one light source, said at least one light source being positioned so as not obstruct the flow of the fluid, air and/or water, during its passage inside the device.

22. The filtration device according to claim 19, wherein said at least one light source is selected from among a light source, said light source being a LED, with a colour temperature comprised between 6000 and 7000 K, an irradiance comprised between 70 and 100 W/m² and a yield in terms of luminous flux comprised between 500 and 1000 lm.

\* \* \* \* \*